United States Patent [19]

Suzuki

[11] Patent Number: 4,904,574
[45] Date of Patent: Feb. 27, 1990

[54] METHOD FOR STABILIZING ORGANIC BASE MATERIAL TO LIGHT

[75] Inventor: Yoshiaki Suzuki, Ashigara, Japan

[73] Assignee: Fuji Photo Film Co., Ltd., Kanagawa, Japan

[21] Appl. No.: 155,578

[22] Filed: Feb. 12, 1988

[30] Foreign Application Priority Data

Feb. 13, 1987 [JP] Japan .................. 62-031096

[51] Int. Cl.$^4$ ............................................. C09D 11/00
[52] U.S. Cl. ..................................... 430/372; 430/17;
430/216; 430/270; 430/495; 430/517; 430/551;
430/559; 406/22; 524/84
[58] Field of Search ............... 430/372, 551, 270, 495,
430/945, 930, 17, 216, 512, 517, 559; 406/22;
549/3; 524/84

[56] References Cited

U.S. PATENT DOCUMENTS 4,246,329  1/1981  Hara et al. ............................ 430/551
4,713,314  12/1987  Namba et al. ......................... 430/964

FOREIGN PATENT DOCUMENTS 18394  7/1986  Japan .

OTHER PUBLICATIONS

Gerhard N. Schrauzer and Horst Kisch, Stabilization of 1,3-Dipoles by II. Complex Formation, Journal of the American Chemical Society, Apr. 18, 1973, p. 2502.

Primary Examiner—Paul R. Michl
Assistant Examiner—Thorl Chea
Attorney, Agent, or Firm—Birch, Stewart, Kolasch & Birch

[57] ABSTRACT

A method of stabilizing organic base materials to light by allowing an organic base material to coexist with at least one type of metal complex which can be represented by the following general formula:

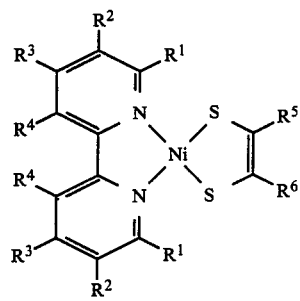

wherein $R^1$ to $R^4$ are each independently hydrogen atoms, halogen atoms, cyano groups, hydroxyl groups or alkyl groups, aryl groups, cycloalkyl groups or heterocyclic groups which are bonded directly or indirectly via a divalent linking group to a carbon atom on the benzene ring. The $R^1$ to $R^4$ substituents may be the same or different, and moreover, two adjacent substituents from among the $R^1$ to $R^4$ substituents may be joined together to form a ring. Furthermore, the two $R^4$ substituents may also be joined together to form a ring.

The $R^5$ and $R^6$ substituents are independently hydrogen atoms, alkyl groups, alkylthio groups, aryl groups, arylthio groups, heterocyclicthio groups or cyano groups and they may be the same or different. In addition, the $R^5$ and $R^6$ substituents may be joined together to form a ring.

20 Claims, 1 Drawing Sheet

METHOD FOR STABILIZING ORGANIC BASE MATERIAL TO LIGHT

FIELD OF THE INVENTION

This invention concerns the stabilization of organic base materials to light, and more precisely it concerns the stabilization of organic compounds, especially organic dyes, and polymeric materials, to light.

BACKGROUND OF THE INVENTION

It is well known that, in general, organic base materials such as organic dyes are affected by the action of light and tend to fade or change in color when exposed to light. Research has been carried out in connection with ink and textile dyes and in the field of photography in order to prevent the occurrence of this type of fading or change in coloration of the organic dyes. In other words, the purpose of this research is to improve the light resistance of these materials. Accordingly, the invention of this application can be usefully employed for improving the light resistance of the organic base materials described above.

In the specification of this application the terms "organic base material" and "base compound" encompass materials which appear to be colored or colorless to the human eye when viewed in sunlight and not just to those substances which have an absorption maximum in the visible range. Optical whiteners or materials which have an absorption maximum in the infrared region are also within the scope of the invention. In the invention of this application the organic base materials include organic substances which have an absorption maximum within the range from about 300 nm in the ultraviolet region to about 2,000 nm in the infrared region.

In the specification of this application the term "dye" encompasses those organic compounds which appear to be colored to the human eye when viewed in sunlight.

Furthermore, in the specification of this application the term "light" signifies electromagnetic radiation of wavelength less than about 2,000 nm and includes ultraviolet radiation of wavelength below about 400 nm, visible light of wavelength from about 400 nm to about 700 nm and near infrared radiation of wavelength from about 700 nm to about 2,000 nm.

It was known in the past that organic base materials, for example, dyes, tended to fade or change color on exposure to light. A number of methods for reducing the extent of any such fading or changes in color, which is to say methods of improving the light resistance of these materials have been reported. For example, in U.S. Pat. No. 3,432,300 it is disclosed that fastness to visible light and ultraviolet radiation can be improved by mixing organic compounds such as indophenol, indoaniline and azo and azomethine dyes with phenol type compounds which have a fused heterocyclic ring system.

In general, azomethine dyes or indoaniline dyes are formed by a reaction between the oxidized form of a primary aromatic amine based developing agent and a color forming agent (a coupler) in the manner described in chapter 17 of *The Theory of the Photographic Process*, by C. E. K. Mees and T. H. James (published by the Macmillan Co., 1967) for the case of silver halide photographic photosensitive materials. There are also a number of known methods by which the stability of the images formed by these dyes can be improved, which is to say by which the colored images can be stabilized to light. For example, the use of hydroquinone derivatives disclosed in U.S. Pat. Nos. 2,360,290, 2,418,613, 2,675,314, 2,701,197, 2,704,713, 2,728,659, 2,732,300, 2,735,765, 2,710,801 and 2,816,028 and British Patent 1,363,921, the use of gallic acid derivatives disclosed in U.S. Pat. Nos. 3,457,079 and 3,069,262 and Japanese Patent Publication No. 13496/68, the use of p-alkoxyphenols disclosed in U.S. Pat. Nos. 2,735,765 and 3,698,909 and the use of chromans and coumarans, etc., such as those disclosed in U.S. Pat. Nos. 3,432,300, 3,573,050, 3,574,627, 3,764,337, 3,574,626, 3,698,909 and 4,015,990, etc., is well known.

The effect of these above-mentioned prior art compounds is inadequate as agents for the prevention of fading and changes in color.

Furthermore, a method in which the stability to light of organic base compounds is improved by using azomethine quenching compounds such that the absorption maximum is a deeper color than the absorption maximum of the base compounds has been disclosed in British Patent 1,451,000. However, these azomethine quenching compounds are themselves strongly colored so that there is a disadvantage in that they have a considerable effect on the hue of the base material.

It is well known that polymeric compounds such as polyolefins, etc., are degraded by the action of light. Conventional ultraviolet absorbers such as benzophenone derivatives, etc., and hindered amines have often been used to prevent the occurrence of degradation of this type. However, although these compounds have an inhibiting effect on photodegradation of the polymer, they are not really satisfactory.

On the other hand, methods in which metal complexes are used for the stabilization of dyes have been disclosed in British Patent 869,986, U.S. Pat. No. 4,050,938 and *Research Disclosure*, 15162 (1976), and the use of metal complexes for preventing the photodegradation of polymers is described by O. Chicchetti in *Adv. Polymer Sci.*, 7, 70 (1970), by M. S. Allen and J. F. Mckellar in *Chem. Sco. Rev.*, 4, 533 (1975), by D. J. Carlson and D. M. Wiles in *M. Macromol. Sci. Rev. Macromol. Chem.*, C14, 65 (1976), by R. B. Walter and J. F. Johnson in *J. Polymer Sci.*, 15, 29 (1980) and by N. S. Allen in *Chem. Soc. Rev.*, 15, 373 (1986), etc. However, these complexes do not themselves have a pronounced anti-fading effect or anti-photodegradative effect, nor do they have a high solubility in organic solvents. Furthermore, these complexes are difficult to disperse uniformly within a polymer and it is impossible to add them in amounts which would provide an adequate anti-fading effect or anti-photodegradative effect. Moreover, these complexes are themselves strongly colored so that if they are added in large quantities, they have the disadvantage of having adverse affects on the organic base materials, and especially on the hue and purity of a dye.

OBJECTS AND SUMMARY OF THE INVENTION

Hence, one object of the invention of this application is to provide a method for improving the light stability of organic base materials.

Another object of the invention of this application is to provide a method for improving the light stability of these materials without adversely affecting the organic base material, especially the hue or purity of a dye.

Another object of the invention of this application is to provide a method for improving the light stability of organic base materials using organic base material stabilizers which have a high solubility in organic solvents and which are highly miscible with the organic base material.

Another object of the invention is to provide a method for improving the light stability of colored images which make up a color photograhic image.

Another object of the invention of this application is to provide a method for improving the light stability of dyes which are formed by a reaction between a primary aromatic amine developing agent and a color coupler.

Another object of the invention of this application is to provide a method for improving the light stability of dyes which have been dispersed in various plastics by the use of stabilizers which are highly miscible with plastics.

The inventors have carried out various research with a view to achieving the aforementioned objects and the invention is based on the results of this research.

The aforementioned objects have been realized by allowing an organic base material to coexist with at least one compound represented by the following general formula, said organic base material having absorbance between about 300 nm and about 2,000 nm.

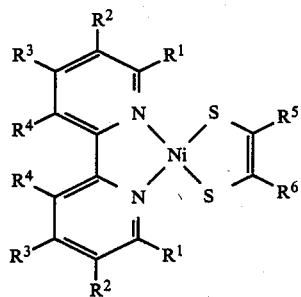

wherein $R^1$ to $R^4$ are each independently hydrogen atoms, halogen atoms, cyano groups, hydroxyl groups or alkyl groups, aryl groups, cycloalkyl groups or heterocyclic groups which are bonded directly or indirectly via a divalent linking group to a carbon atom on the benzene ring. The $R^1$ to $R^4$ substituents may be the same or different, and two adjacent substituents from among $R^1$ to $R^4$ may be joined together to form a ring. Moreover, the two $R^4$ substituents may also be joined together to form a ring.

The $R^5$ and $R^6$ substituents are independently hydrogen atoms, alkyl groups, alkylthio groups, aryl groups, arylthio groups, heterocyclicthio groups or cyano groups and they may be the same or different. In addition, the $R^5$ and $R^6$ substituents may be joined together to form a ring.

DETAILED DESCRIPTION OF THE INVENTION

Figure 1:
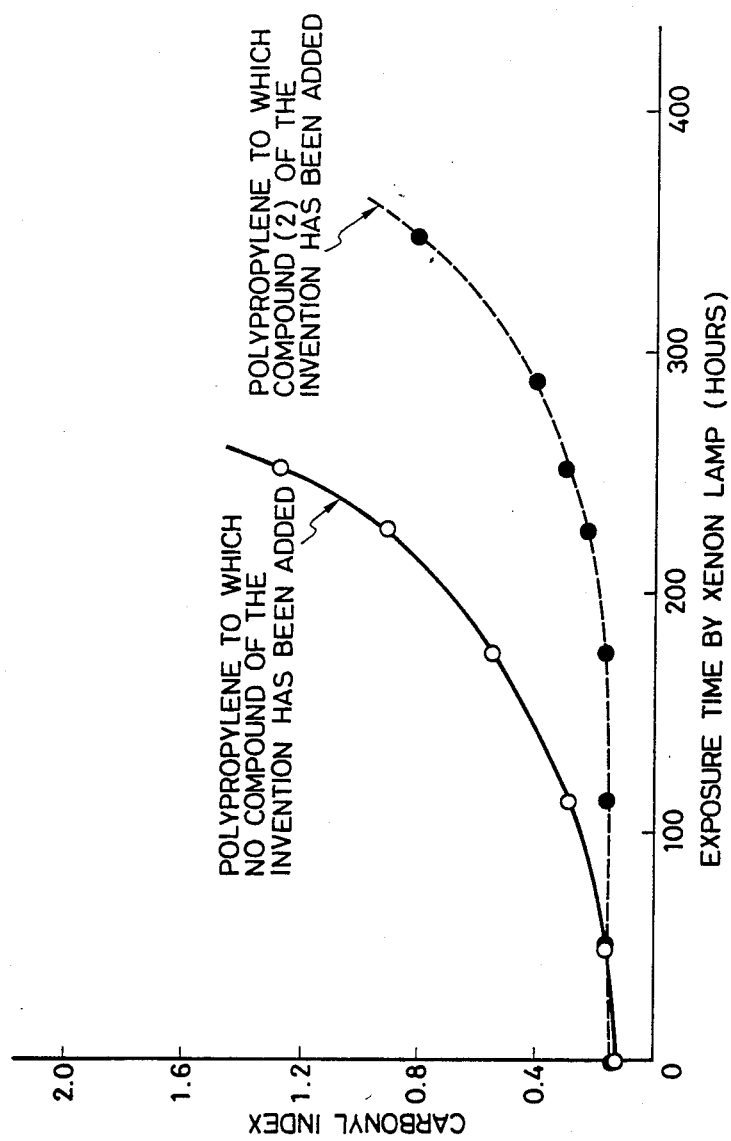
FIG. 1 is a graph which shows the change in the carbonyl index of polypropylene with regard to the exposure time.

The halogen atoms which can be represented by $R^1$ to $R^4$ in the compounds of the aforementioned general formula include fluorine atoms, chlorine atoms, bromine atoms and iodine atoms. The alkyl groups represented by $R^1$ to $R^4$, $R^5$ and $R^6$ are preferably alkyl groups which have from 1 to 20 carbon atoms and they may be of either the linear or branched chain type, and moreover, they may be substituted or unsubstituted alkyl groups.

The aryl groups represented by $R^1$ to $R^4$, $R^5$ and $R^6$ are preferably aryl groups which have from 6 to 14 carbon atoms and they may be substituted or unsubstituted aryl groups.

The heterocyclic groups represented by $R^1$ to $R^4$ are preferably heterocyclic groups which have 5- or 6-membered rings and they may be substituted or unsubstituted heterocyclic groups.

The cycloalkyl groups represented by $R^1$ to $R^4$ are preferably cycloalkyl groups which have 5- or 6-membered rings, and they may be substituted or unsubstituted cycloalkyl groups.

The rings which are formed by the joining together of adjacent substituents from among $R^1$ to $R^4$ are preferably 6-membered rings and are most desirably benzene rings. These benzene rings may be substituted rings or unsubstituted rings or they may be condensed rings.

The rings formed by the joining together of the two $R^4$ substituents are preferably 6-membered rings and are most desirably benzene rings. These benzene rings may be substituted rings or unsubstituted rings or they may be condensed rings.

The linear or branched chain alkyl groups represented by $R^1$ to $R^4$, $R^5$ and $R^6$ may be, for example, methyl groups, ethyl groups, propyl groups, butyl groups, hexyl groups, octyl groups, decyl groups, dodecyl groups, tetradecyl groups, hexadecyl groups, octadecyl groups, etc.

The aryl groups represented by $R^1$ to $R^4$, $R^5$ and $R^6$ may be, for example, phenyl groups, naphthyl groups, etc.

The heterocyclic groups represented by $R^1$ to $R^4$ may be 5- or 6-membered heterocyclic groups which may contain at least one nitrogen atom, oxygen atom or sulfur atom in the ring as the hetero atom. Representative examples of the heterocyclic groups include furyl groups, hydrofuryl groups, thienyl groups, pyrrolyl groups, pyrrolidyl group, pyridyl groups, imidazolyl groups, pyrazolyl groups, quinolyl groups, indolyl groups, oxazolyl groups, thiazolyl groups, etc.

The cycloalkyl groups represented by $R^1$ to $R^4$ may be, for example, cyclopentyl groups, cyclohexyl groups, cyclohexenyl groups, cyclohexadienyl groups, etc.

The 6-membered rings which are formed by the joining together of adjacent substituents from among the $R^1$ to $R^4$ substituents may be, for example, benzene rings, naphthalene rings, isobenzothiophene rings, isobenzofuran rings, isoindolene rings, etc.

The alkyl groups, cycloalkyl groups, aryl groups or heterocyclic groups represented by $R^1$ to $R^4$ may be bonded to a carbon atom in the benzene ring via a divalent linking group, for example, an oxy group (—O—), a thio group (—S—), an amino group, an oxycarbonyl group, a carbonyl group, a carbamoyl group, a sulfamoyl group, a carbonylamino group, a sulfonyl group or a carbonyloxy group, etc.

Examples of alkyl groups which are bonded to a carbon atom in the benzene ring via the aforementioned divalent linking group and represented by $R^1$ to $R^4$ include alkoxy groups (for example, methoxy groups, ethoxy groups, butoxy groups, propoxy groups, n-decyloxy groups, n-dodecyloxy groups or n-hexadecyloxy groups, etc.), alkoxycarbonyl groups (for example, methoxycarbonyl groups, ethoxycarbonyl groups, butoxycarbonyl groups, n-decyloxycarbonyl groups or n-hexadecyloxycarbonyl groups, etc.), acyl groups (for example, acetyl groups, valeryl groups, stearoyl groups, benzoyl groups or toluoyl groups, etc.), acyloxy groups (for example, acetoxy groups or hexadecylcarbonyloxy groups, etc.), alkylamino groups (for example, n-butylamino groups, N,N-diethylamino groups or N,N-didecylamino groups, etc.), alkylsulfamoyl groups (for example, butylsulfamoyl groups, N,N-diethylsulfamoyl groups or n-dodecylsulfamoyl groups, etc.), sulfonylamino groups (for example, methylsulfonylamino groups or butylsulfonylamino groups, etc.), sulfonyl groups (for example, mesyl groups or ethanesulfonyl groups, etc.) and acylamino groups (for example, acetylamino groups, valerylamino groups, palmitoylamino groups, benzoylamino groups or toluoylamino groups, etc.), etc.

Examples of cycloalkyl groups which are bonded to a carbon atom in a ring of a compound of this invention via the above-mentioned divalent linking groups and represented by $R^1$ to $R^4$ include, for example, cyclohexyloxy groups, cyclohexylcarbonyl groups, cyclohexyloxycarbonyl groups, cyclohexylamino groups, cyclohexenylcarbonyl groups or cyclohexenyloxy groups, etc.

Examples of aryl groups which are bonded to a carbon atom in a ring of a compound of this invention via the above-mentioned divalent linking groups and represented by $R^1$ to $R^4$ include aryloxy groups (for example, phenoxy groups or naphthoxy groups, etc.), aryloxycarbonyl groups (for example, phenoxycarbonyl groups or naphthoxycarbonyl groups, etc.), acyl groups (for example, benzoyl groups or naphthoyl groups, etc.), anilino groups (for example, phenylamino groups, N-methylanilino groups or N-acetylanilino groups, etc.), acyloxy groups (for example, benzoyloxy groups or toluoyloxy groups, etc.), arylcarbamoyl groups (for example, phenylcarbamoyl groups, etc.), arylsulfamoyl groups (for example, phenylsulfamoyl groups, etc.), arylsulfonylamino groups (phenylsulfonylamino group, p-tolylsulfonylamino groups, etc.), arylsulfonyl groups (benzenesulfonyl groups, tosyl groups, etc.) or acylamino groups (for example, benzoylamino groups, etc.).

The alkylthio groups represented by $R^5$ and $R^6$ may be linear chain alkylthio groups or branched chain alkylthio groups and they may be substituted or unsubstituted alkylthio groups. The alkylthio groups represented by $R^5$ and $R^6$ are preferably alkylthio groups which have from 1 to 20 carbon atoms, for example, methylthio groups, ethylthio groups, n-butylthio groups, n-decylthio groups, n-hexadecylthio groups, etc.

The arylthio groups represented by $R^5$ and $R^6$ are preferably arylthio groups which have 6 to 14 carbon atoms and they may be substituted or unsubstituted arylthio groups. The arylthio groups may be, for example, phenylthio groups, 1-naphthylthio groups, etc.

The heterocyclic group of the heterocyclic-thio groups represented by $R^5$ and $R^6$ may be 5- or 6-membered heterocyclic groups which contain at least one nitrogen atom, oxygen atom or sulfur atom in the ring as a hetero atom, and may be, for example, furyl groups, hydrofuryl groups, thienyl groups, pyrrolyl groups, pyrrolidyl groups, pyridyl groups, imidazolyl groups, pyrazolyl groups, quinolyl groups, indolyl groups, oxazolyl groups and thiazolyl groups, etc.

The $R^5$ and $R^6$ substituents may be joined together to form a ring, in which case the ring is preferably a 5- or 6-membered ring, and the elements from which the ring is constructed may include elements other than carbon (for example, oxygen, nitrogen, sulfur, etc.).

The alkyl groups, aryl groups, heterocyclic groups and cycloalkyl groups represented by $R^1$ to $R^4$, the 6-membered rings formed by the bonding together of adjacent substituent groups represented by $R^1$ to $R^4$, the 6-membered rings which are formed by the bonding together of the two substituent groups represented by $R^4$, the alkyl groups, alkylthio groups, aryl groups, arylthio groups and heterocyclicthio groups represented by $R^5$ and $R^6$ and the rings formed by the bonding together of the substituent groups represented by $R^5$ and $R^6$ may be substituted with halogen atoms (for example, chlorine atoms, bromine atoms, fluorine atoms, etc.), cyano groups, hydroxyl groups, oxo groups, thioxo groups, linear or branched chain alkyl groups (for example, methyl groups, ethyl groups, propyl groups, butyl groups, hexyl groups, octyl groups, decyl groups, dodecyl groups, tetradecyl groups, hexadecyl groups, heptadecyl groups, octadecyl groups or methoxyethoxyethyl groups, etc.), aryl groups (for example, phenyl groups, tolyl groups, naphthyl groups, chlorophenyl groups, methoxyphenyl groups or acetylphenyl groups, etc.), alkoxy groups (for example, methoxy groups, ethoxy groups, butoxy groups, propoxy groups or methoxyethoxy groups, etc.), aryloxy groups (for example, phenoxy groups, tolyloxy groups, naphthoxy groups or methoxyphenoxy groups, etc.), alkoxycarbonyl groups (for example, methoxycarbonyl groups, butoxycarbonyl groups or phenoxymethoxycarbonyl groups, etc.), aryloxycarbonyl groups (for example, phenoxycarbonyl groups, tolyloxycarbonyl groups or methoxyphenoxycarbonyl groups, etc.), acyl groups (for example, formly groups, acetyl groups, valeryl groups, stearoyl groups, benzoyl groups, toluoyl groups, naphthoyl groups or p-methoxybenzoyl groups, etc.), acyloxy groups (for example, acetoxy groups or benzoyloxy groups, etc.), acylamino groups (for example, acetamido groups, benzamido groups or methoxyacetamido groups, etc.), anilino groups (for example, phenylamino groups, N-methylanilino groups, N-phenylanilino groups or N-acetylanilino groups, etc.), alkylamino groups (for example, n-butylamino groups, N,N-diethylamino groups, 4-methoxy-n-butylamino groups, etc.), carbamoyl groups (for example, n-butylcarbamoyl groups, N,N-diethylcarbamoyl groups, n-butylsulfamoyl groups, N,N-diethylsulfamoyl groups, n-dodecylsulfamoyl groups or N-(4-methoxy-n-butyl)sulfamoyl groups, etc.), sulfonylamino groups (for example, methylsulfonylamino groups, phenylsulfonylamino groups or methoxymethylsulfonylamino groups, etc.) or sulfonyl groups (for example, mesyl groups, tosyl groups or methoxymethanesulfonyl groups, etc.), etc.

The preparation of (dipyridyl) (cis-1,2-ethylenedithiolato)nickel derivatives which can be represented by the aforementioned general formula can be achieved in the following way.

A cis-1,2-diethylenedithiol derivative or an alkali metal salt thereof is dissolved in anhydrous methanol. (In some cases it is prepared from precursors.) A (dipyridyl) (dihalo)nickel(II) derivative complex is then added to this solution in the form of a powder or as a solution in methanol, the mixture is stirred and the precipitate which is formed is removed by filtration. The precipitate is extracted with an organic solvent such as dichloromethane and concentrated and crystals of the complex are obtained on adding methanol slowly to the concentrated solution.

The preferred compounds which can be represented by the aforementioned general formula are shown in Table 1 but of course the invention is not limited to these illustrative compounds. Only the substituents of the illustrative compounds of this invention are indicated in Table 1. The illustrative compounds are also shown below.

(1)
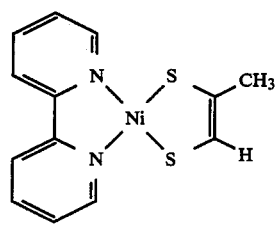

(2)
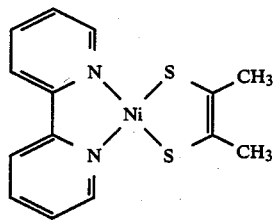

(3)
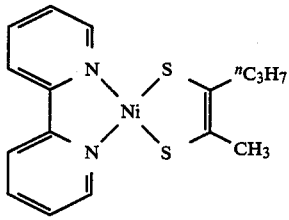

(4)
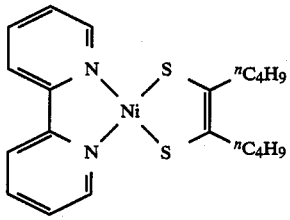

(5)
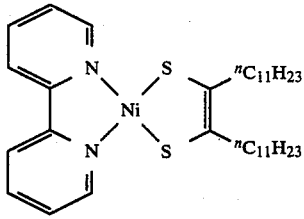

-continued (6)
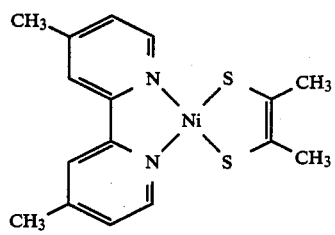

(7)
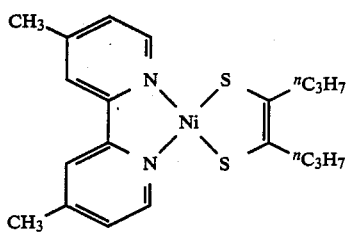

(8)
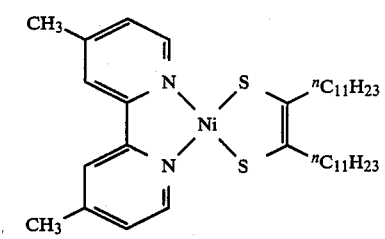

(9)
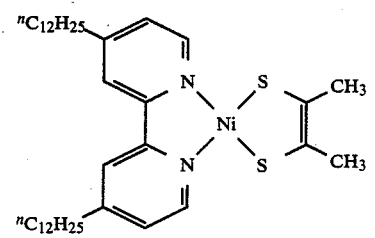

(10)
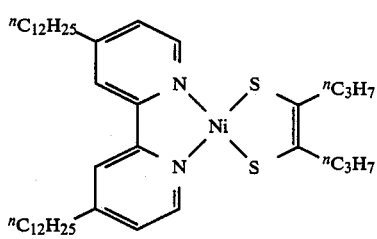

(11)
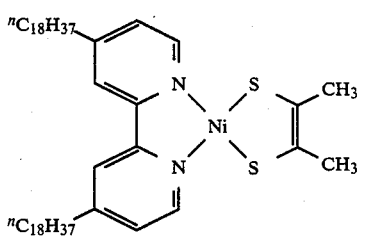

-continued
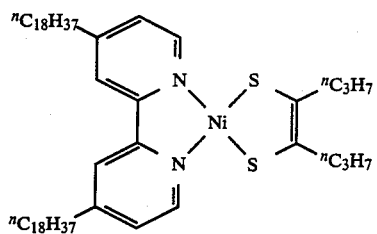 (12)
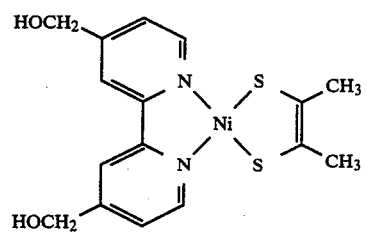 (13)
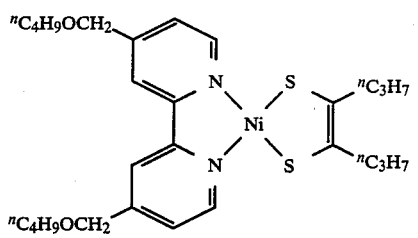 (14)
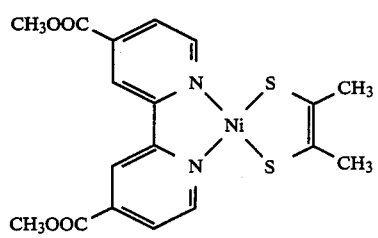 (15)
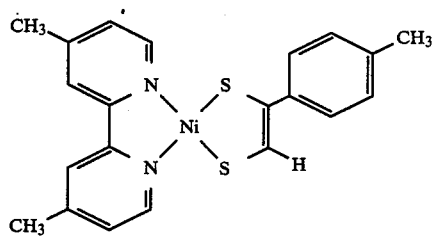 (16)
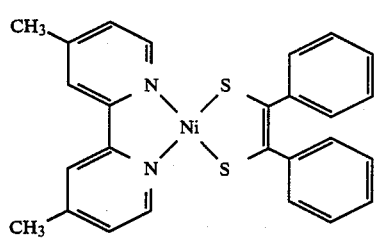 (17)
-continued
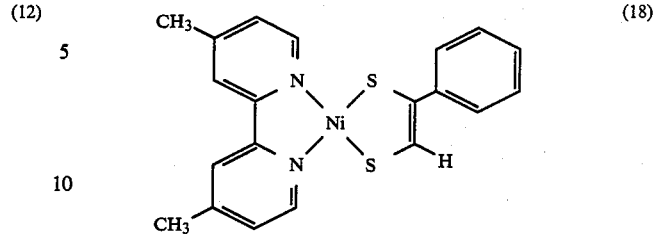 (18)
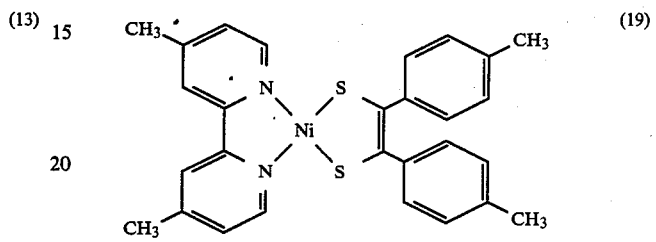 (19)
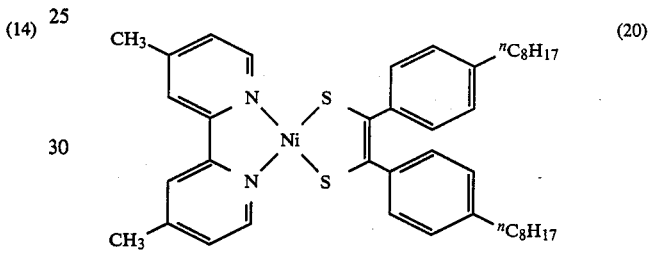 (20)
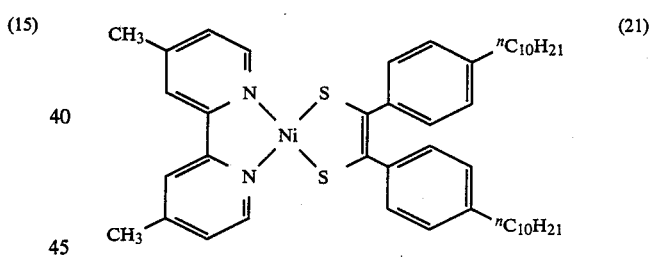 (21)
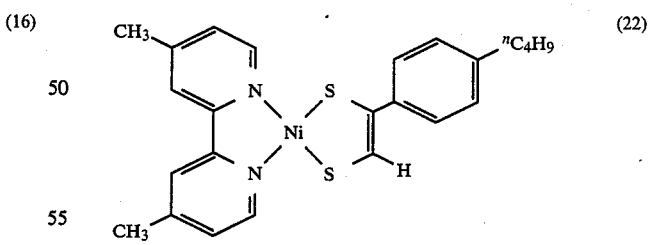 (22)
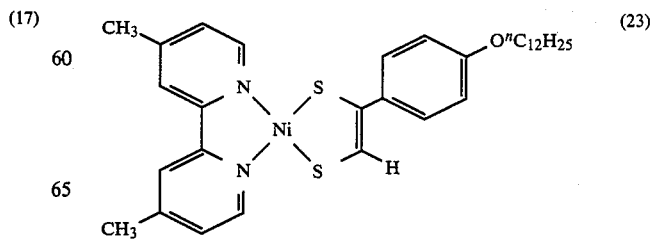 (23)

-continued
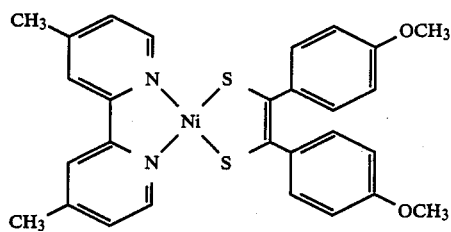 (24)
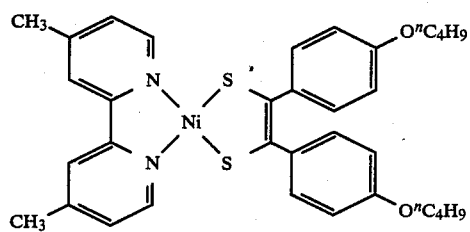 (25)
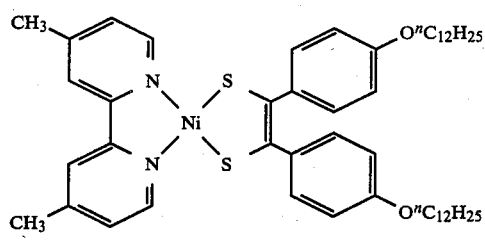 (26)
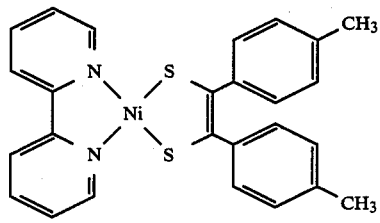 (27)
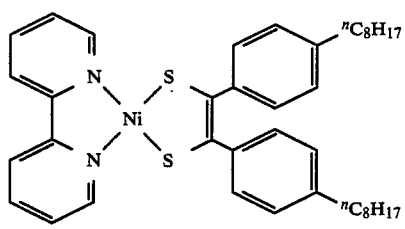 (28)
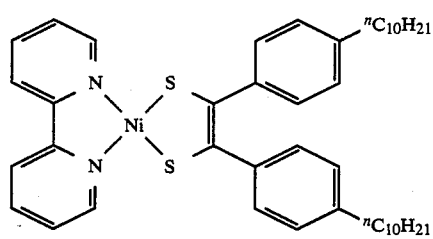 (29)
-continued
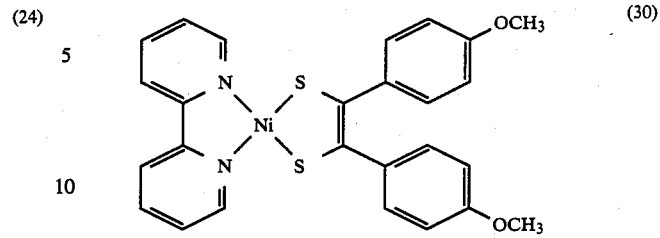 (30)
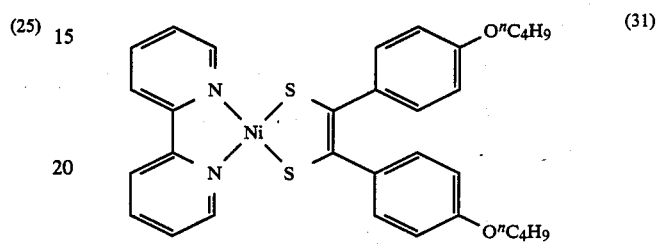 (31)
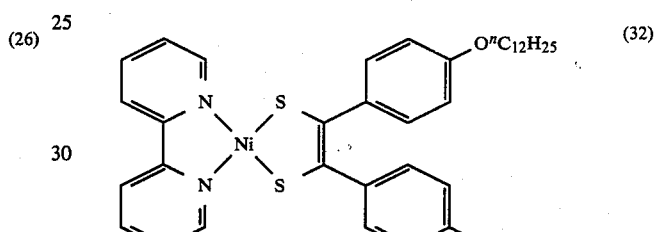 (32)
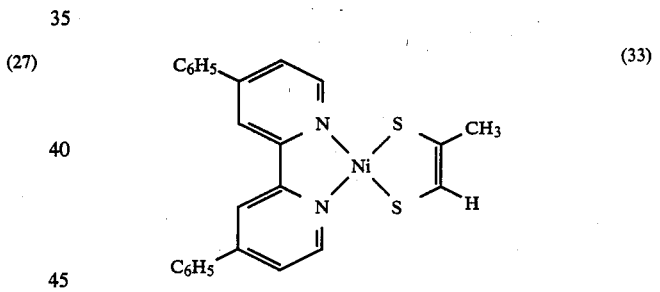 (33)
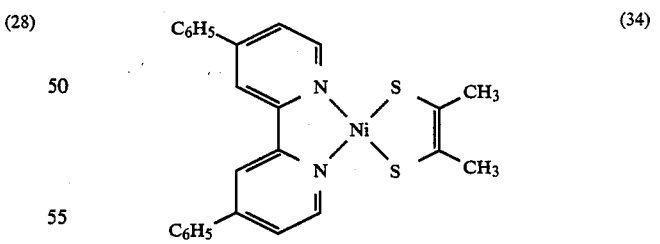 (34)
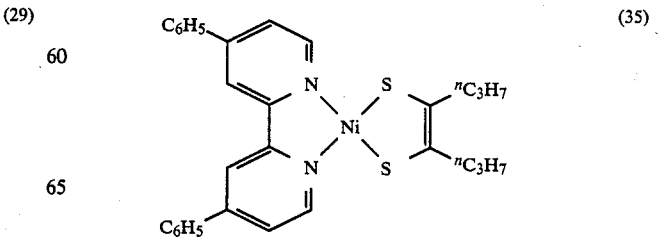 (35)

-continued
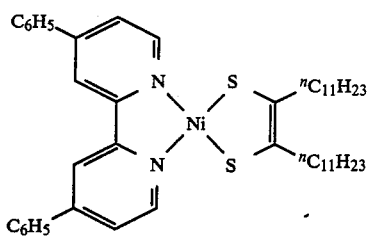 (36)
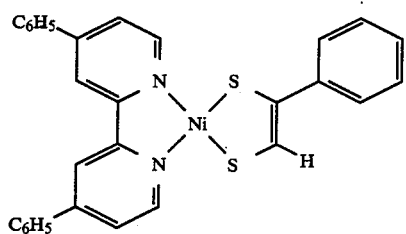 (37)
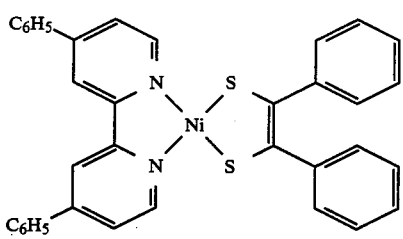 (38)
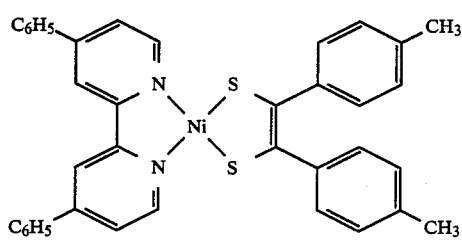 (39)
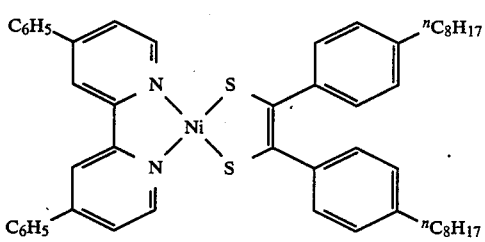 (40)
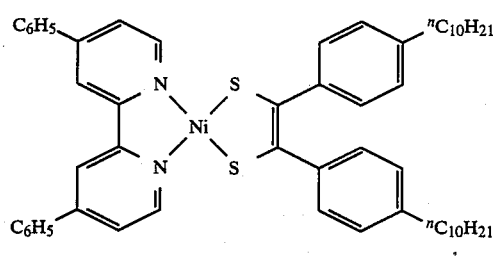 (41)
-continued
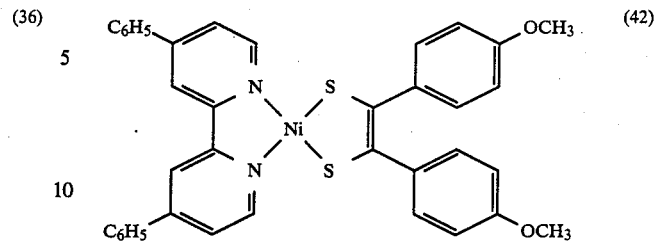 (42)
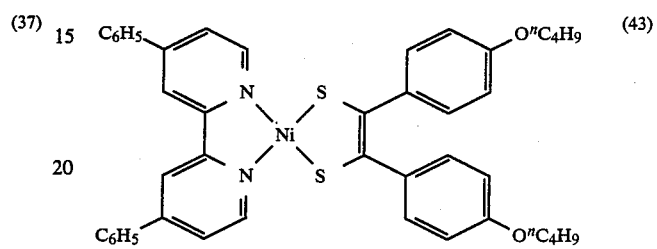 (43)
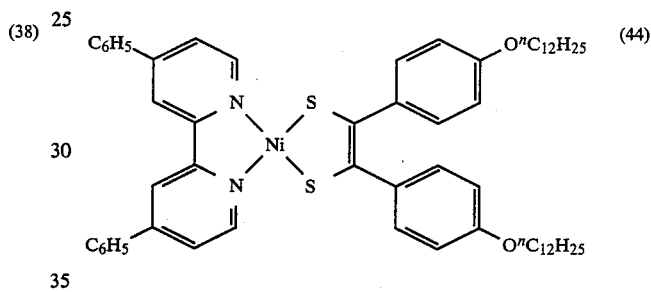 (44)
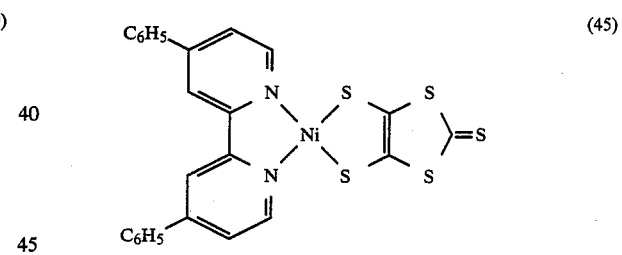 (45)
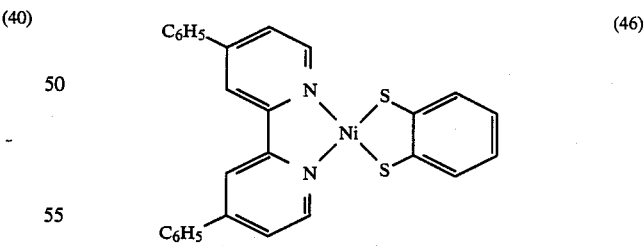 (46)
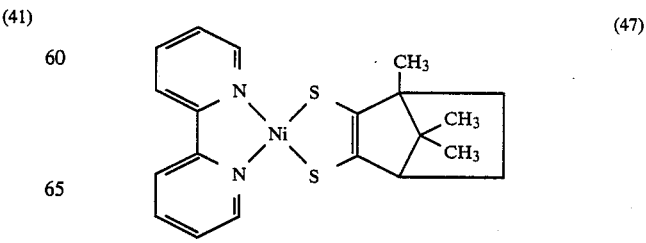 (47)

-continued
(48)
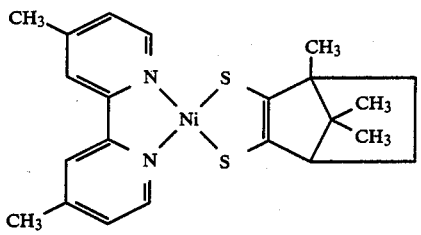
(49)
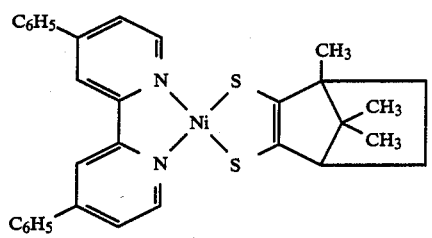
(50)
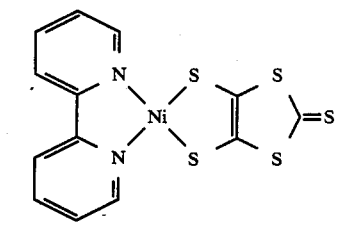
(51)
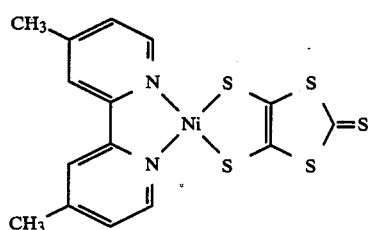
(52)
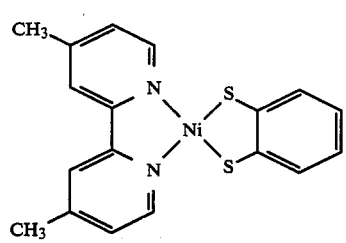
(53)
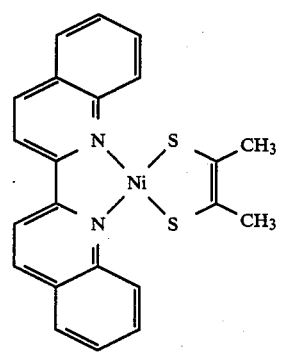
-continued
(54)
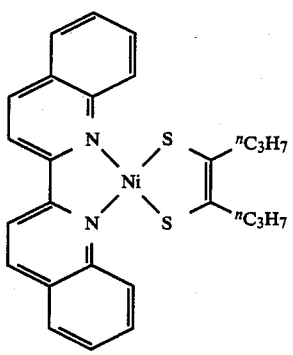
(55)
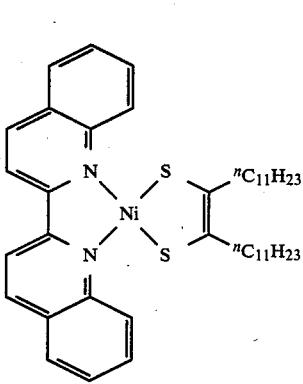
(56)
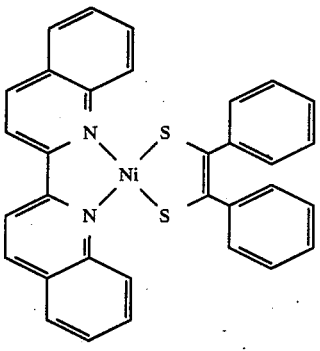
(57)
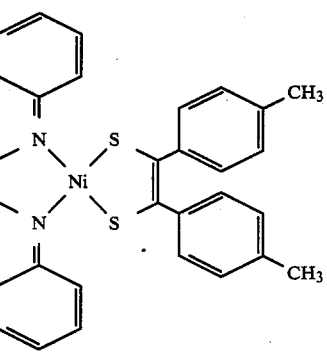

-continued
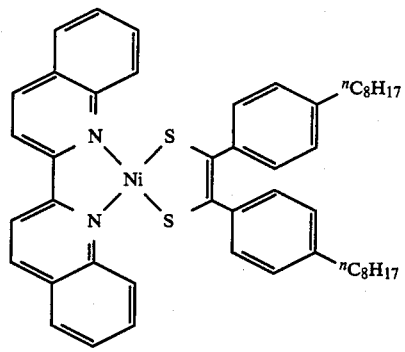
(58)
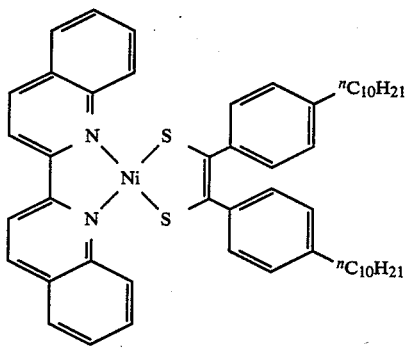
(59)
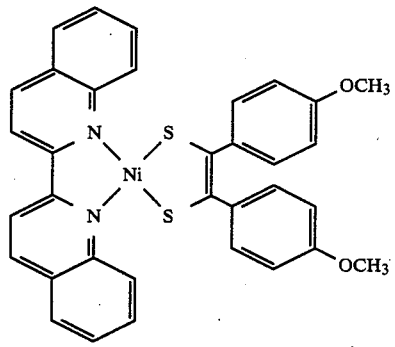
(60)
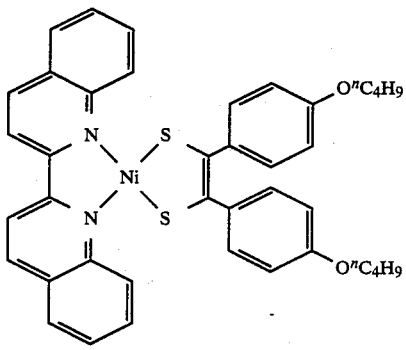
(61)
-continued
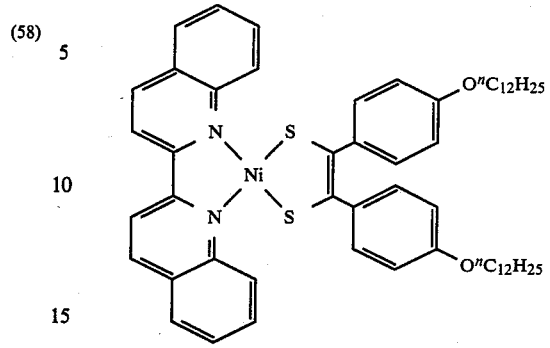
(62)
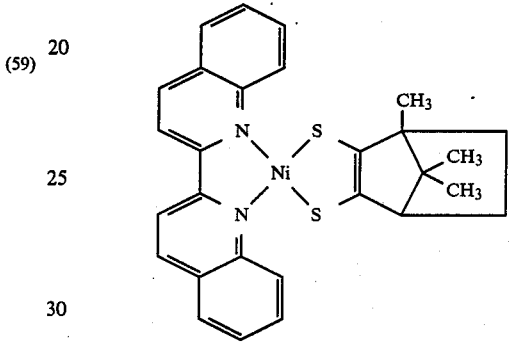
(63)
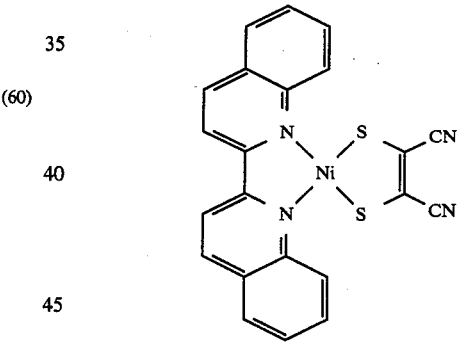
(64)
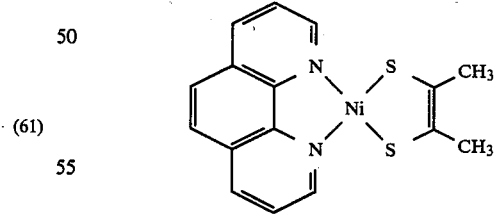
(65)
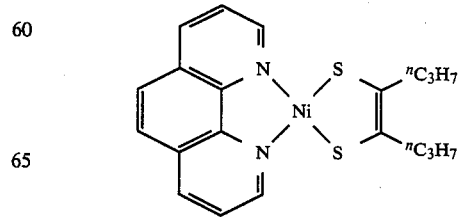
(66)

-continued
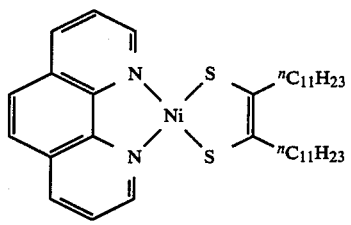  (67)
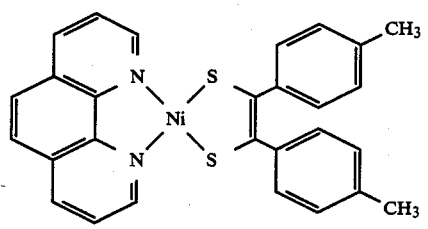  (68)
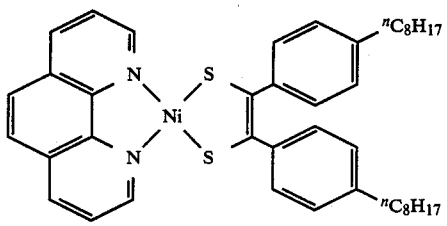  (69)
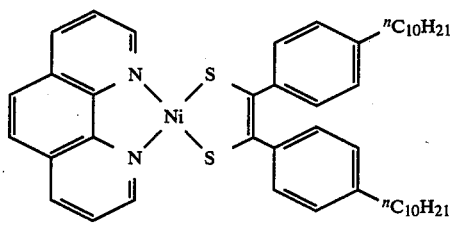  (70)
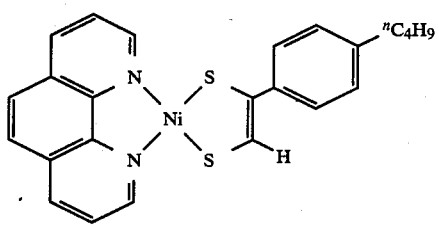  (71)
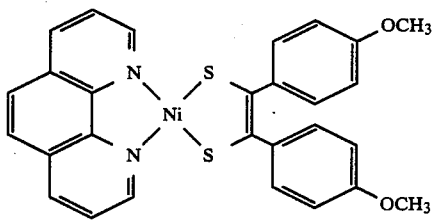  (72)
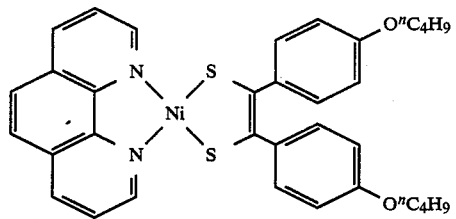  (73)
-continued
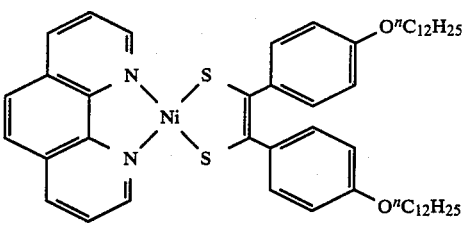  (74)
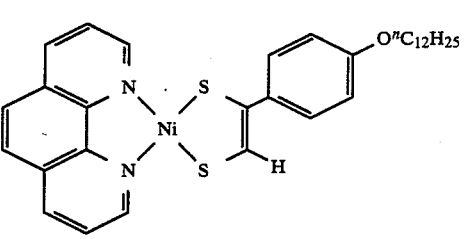  (75)
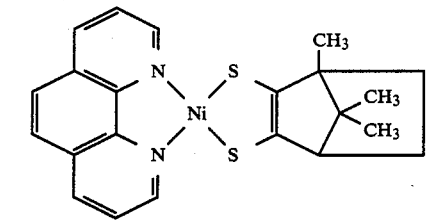  (76)
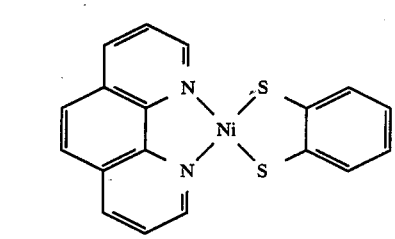  (77)
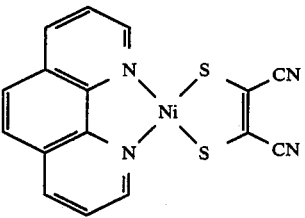  (78)
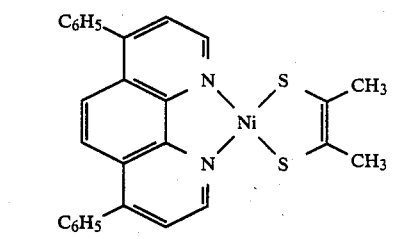  (79)

-continued
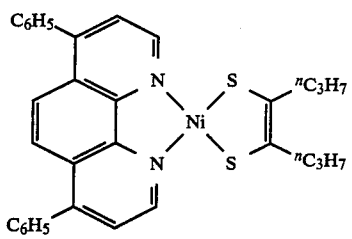 (80)
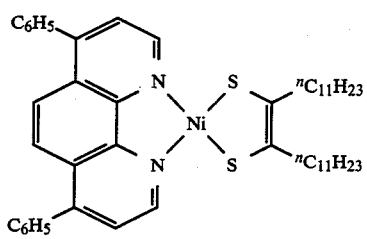 (81)
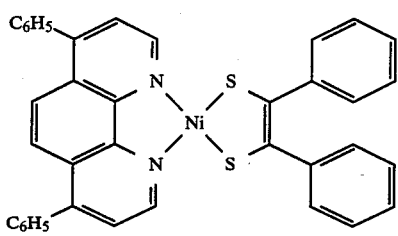 (82)
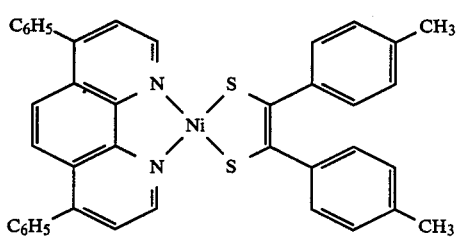 (83)
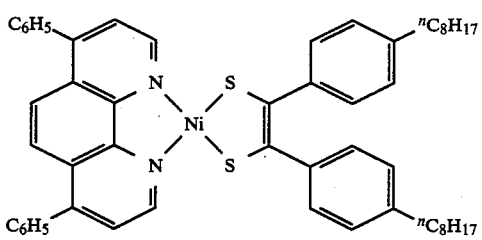 (84)
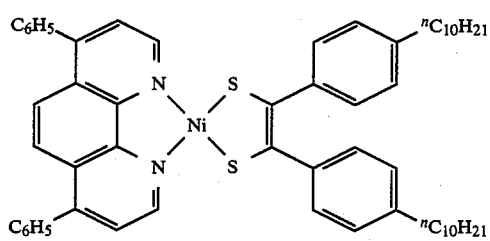 (85)
-continued
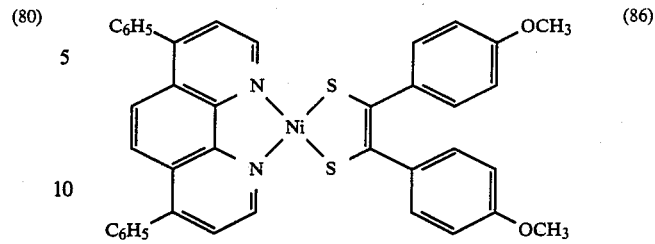 (86)
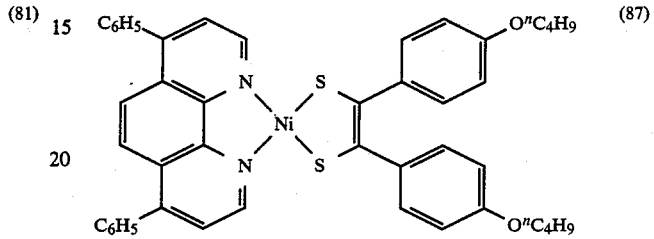 (87)
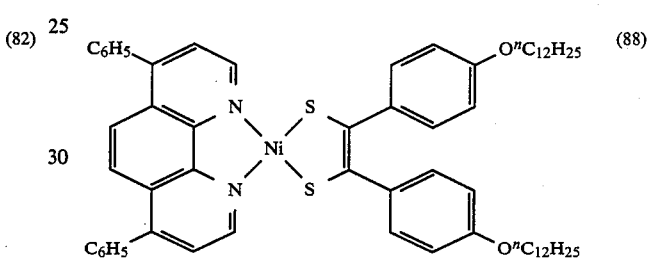 (88)
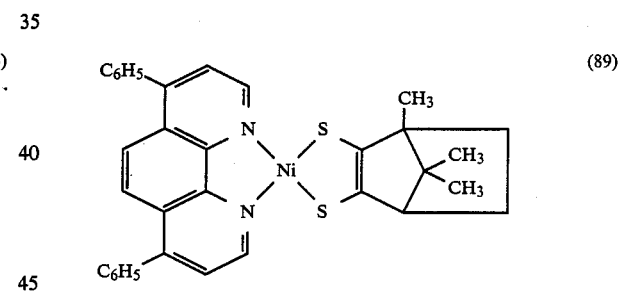 (89)
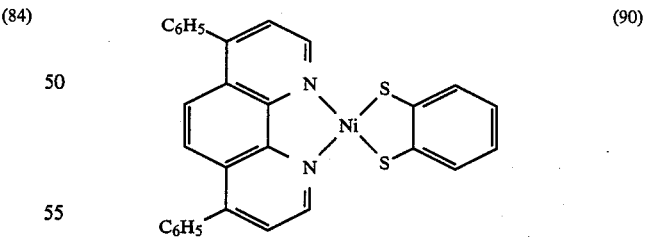 (90)
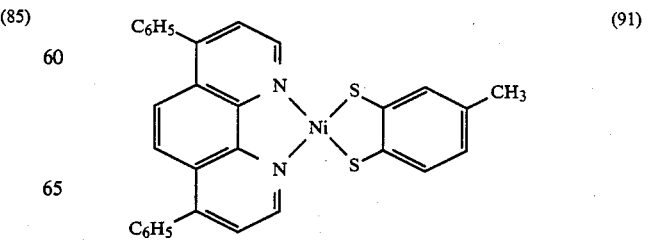 (91)

-continued
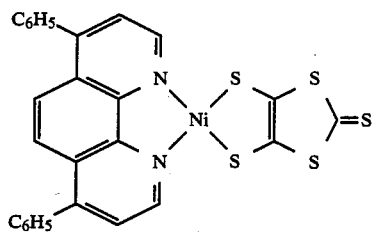 (92)
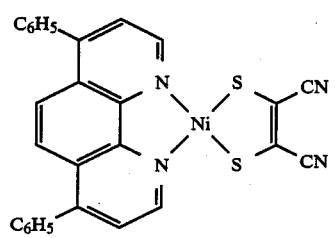 (93)
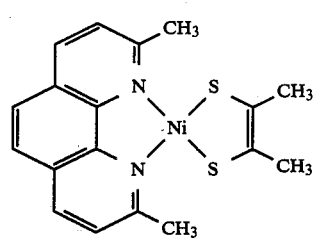 (94)
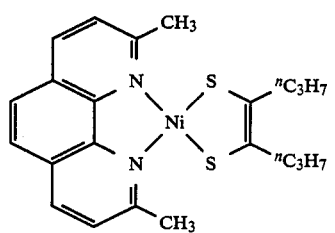 (95)
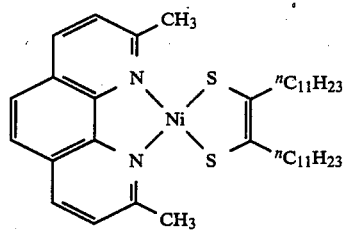 (96)
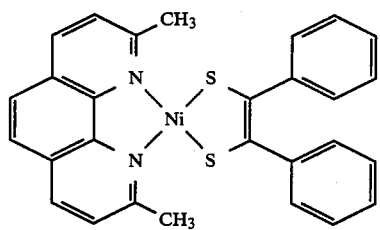 (97)
-continued
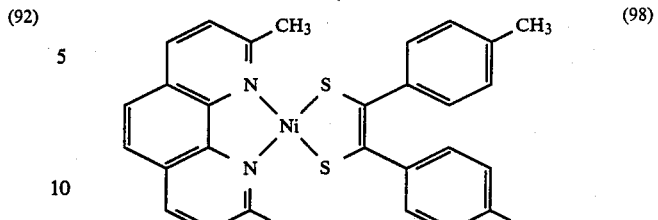 (98)
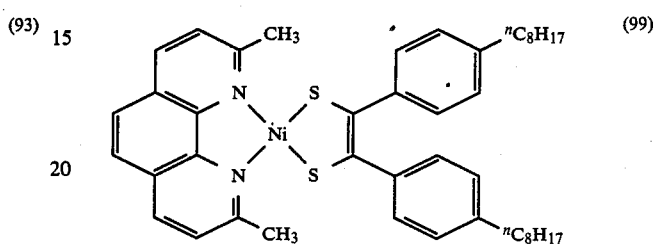 (99)
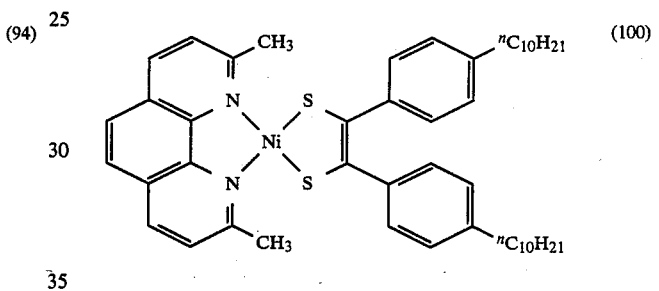 (100)
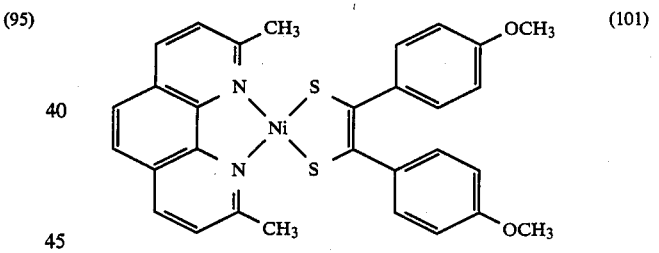 (101)
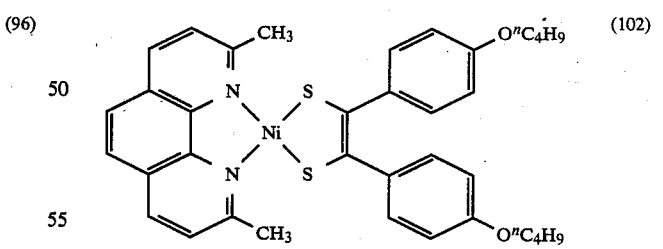 (102)
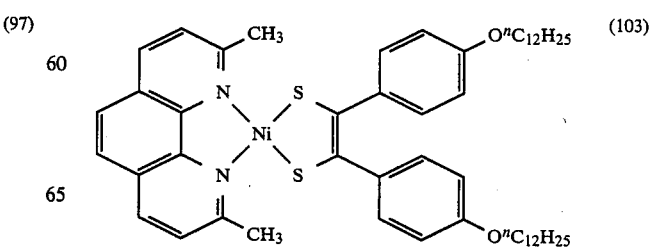 (103)

-continued
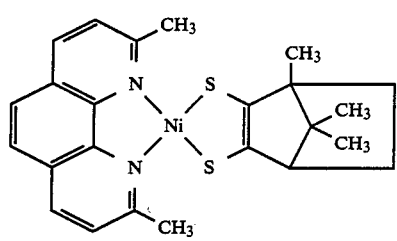 (104)
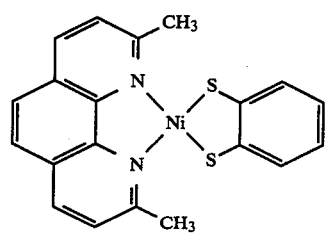 (105)
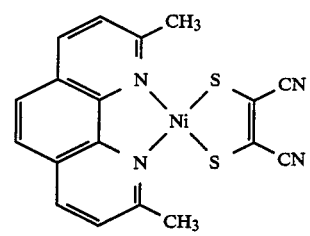 (106)
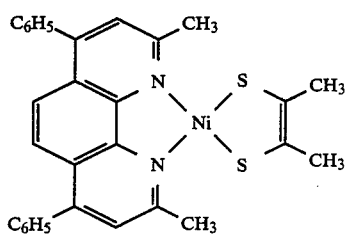 (107)
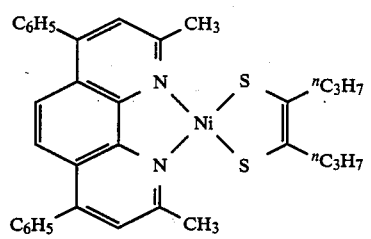 (108)
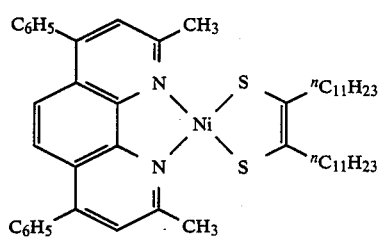 (109)
-continued
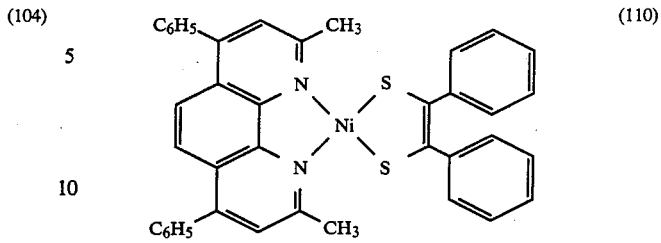 (110)
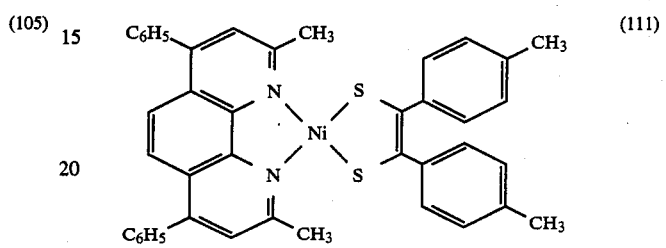 (111)
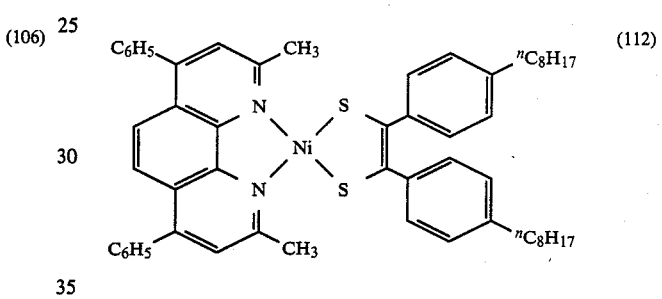 (112)
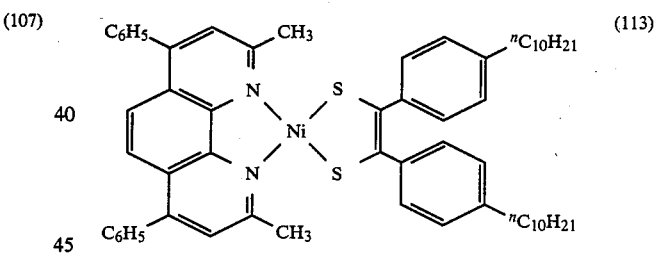 (113)
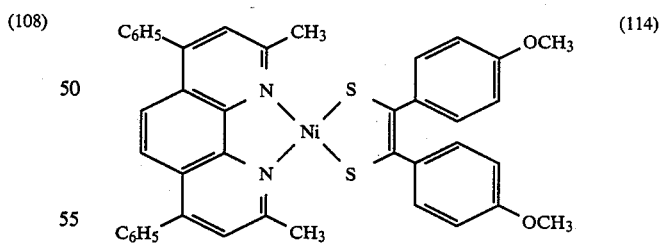 (114)
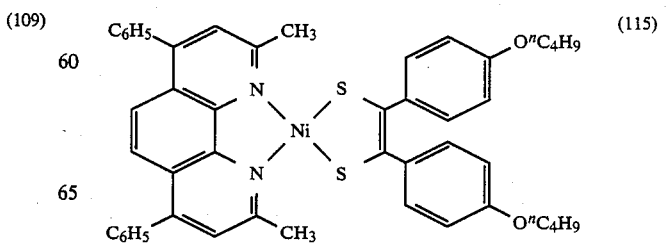 (115)

-continued
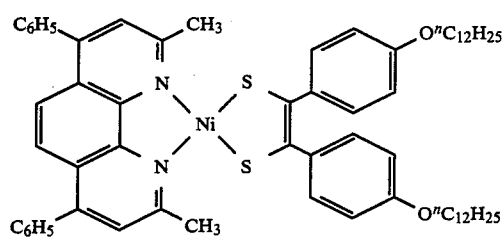 (116)
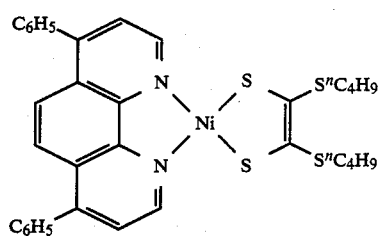 (122)
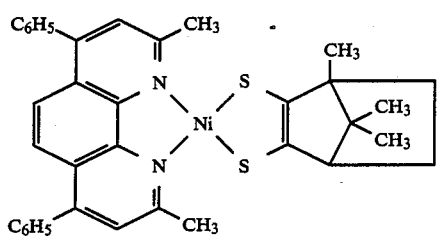 (117)
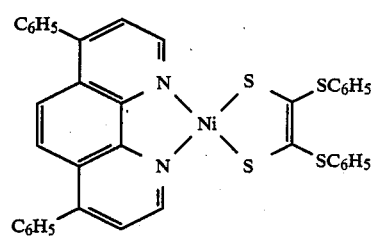 (123)
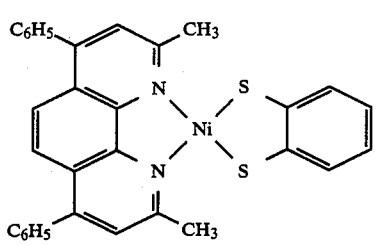 (118)
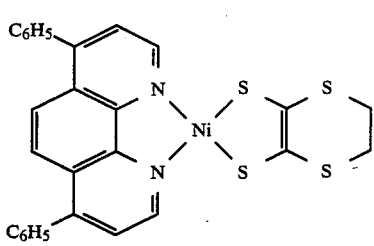 (124)
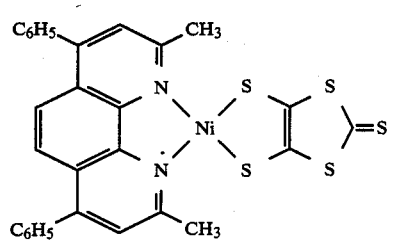 (119)
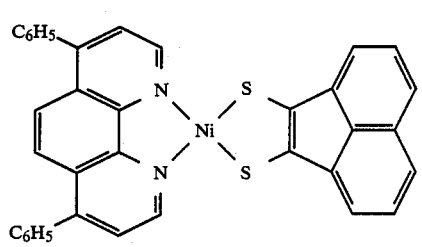 (125)
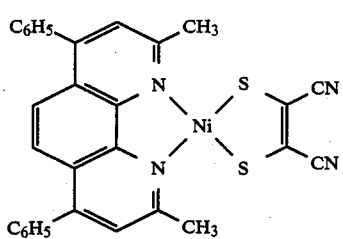 (120)
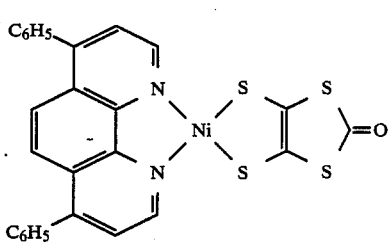 (126)
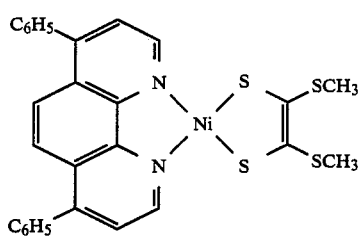 (121)
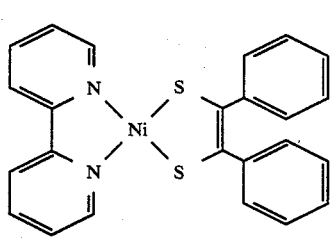 (127)

(128)

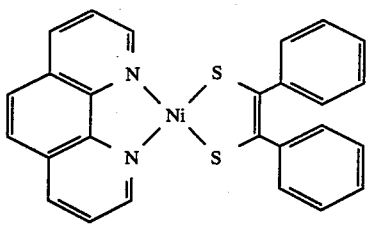

(129)

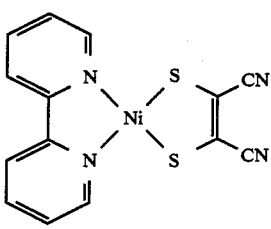

(130)

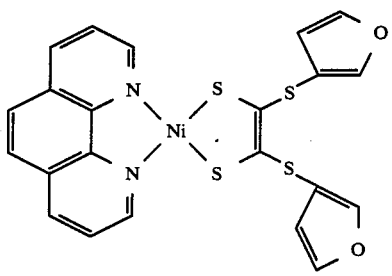

The various (dipyridyl) (dihalo)nickel derivative starting materials which are used in this invention can be prepared using the method disclosed in *J. Inorg. Nucl. Chem.*, 29, 1047 (1967).

Furthermore, the compounds of this invention can be prepared using the methods disclosed in Examples 1 to 4 of the specification of Japanese Patent Application No. 271114/86, for example. The absorption maxima, ($\lambda_{max}$), the molar extinction coefficients ($\epsilon_{max}$·l·mol$^{-1}$·cm$^{-1}$ units) and the melting points (decomposition points) of some of these compounds are shown in Table 1 below.

TABLE 1

| Compound | $\lambda_{max}$ (nm) | $\epsilon_{max}$ (× 10$^4$) | Melting Point (°C.) |
|---|---|---|---|
| (1) | 607 | 0.39 | 238–248 |
| (2) | 614 | 0.43 | 258–260 |
| (3) | 614 | 0.42 | 250–253 |
| (5) | 614 | 0.43 | 231–235 |
| (6) | 590 | 0.37 | 212–220 |
| (8) | 592 | 0.42 | 201–205 |
| (9) | 595 | 0.41 | 187–191 |
| (13) | 595 | 0.42 | 210–212 |
| (14) | 598 | 0.43 | 214–217 |
| (15) | 587 | 0.37 | 201–205 |
| (17) | 574 | 0.43 | 240–242 |
|  | 915 | 0.11 |  |
| (18) | 570 | 0.33 | 221–225 |
|  | 903 | 0.11 |  |
| (19) | 578 | 0.41 | 239–242 |
|  | 916 | 0.13 |  |
| (21) | 575 | 0.41 | 187–189 |
|  | 915 | 0.11 |  |
| (24) | 582 | 0.47 | 144–150 |
|  | 930 | 0.13 |  |
| (26) | 580 | 0.43 | 156–160 |
|  | 931 | 0.12 |  |
| (27) | 566 | 0.41 | 177–181 |
|  | 925 | 0.13 |  |

TABLE 1-continued

| Compound | $\lambda_{max}$ (nm) | $\epsilon_{max}$ (× 10$^4$) | Melting Point (°C.) |
|---|---|---|---|
| (30) | 610 | 0.52 | 222–225 |
|  | 920 | 0.14 |  |
| (32) | 616 | 0.50 | 201–203 |
|  | 920 | 0.13 |  |
| (34) | 567 | 0.40 | 214–220 |
| (38) | 586 | 0.47 | 226–230 |
|  | 930 | 0.13 |  |
| (39) | 590 | 0.47 | 218–223 |
|  | 933 | 0.11 |  |
| (42) | 591 | 0.51 | 211–215 |
|  | 930 | 0.17 |  |
| (45) | 483 | 0.47 | 246–253 |
|  | 560 | sh* |  |
|  | 1,060 | 0.17 |  |
| (46) | 531 | 0.38 | >300 |
| (47) | 608 | 0.42 | 178–181 |
| (51) | 470 | 0.43 | 204–208 |
|  | 544 | sh* |  |
|  | 1,150 | 0.16 |  |
| (52) | 528 | 0.41 | >300 |
| (54) | 626 | 0.44 | 276–280 |
| (57) | 590 | 0.40 | 243–247 |
|  | 937 | 0.12 |  |
| (60) | 583 | 0.46 | 268–273 |
|  | 940 | 0.11 |  |
| (63) | 617 | 0.47 | 167–173 |
| (65) | 624 | 0.37 | 248–255 |
| (66) | 624 | 0.40 | 233–270 |
| (68) | 621 | 0.81 | 254–257 |
| (72) | 628 | 0.79 | 255–261 |
| (76) | 623 | 0.41 | 183–185 |
| (79) | 636 | 0.47 | 264–270 |
| (81) | 638 | 0.43 | 193–197 |
| (82) | 618 | 0.78 | >300 |
| (83) | 963 | 0.76 | >300 |
| (85) | 966 | 0.76 | 216–220 |
| (86) | 970 | 0.72 | 252–255 |
| (88) | 970 | 0.68 | 211–216 |
| (89) | 633 | 0.45 | 178–182 |
| (90) | 560 | 0.38 | >300 |
| (92) | 522 | 0.53 | 272–276 |
|  | 1,220 | 0.11 |  |
| (93) | 378 | 1.38 | 248–251 |
| (94) | 770 | 0.44 | 227–23 |
| (96) | 772 | 0.43 | 197–203 |
| (98) | 908 | 0.78 | 281–286 |
| (100) | 910 | 0.73 | 213–217 |
| (101) | 915 | 0.77 | 179–183 |
| (103) | 917 | 0.78 | 167–171 |
| (104) | 768 | 0.38 | 173–176 |
| (107) | 633 | 0.41 | >300 |
| (110) | 628 | 0.40 | >300 |
| (111) | 628 | 0.37 | >300 |
| (113) | 630 | 0.43 | 281–288 |
| (114) | 973 | 0.74 | >300 |
| (116) | 966 | 0.77 | 227–235 |
| (117) | 641 | 0.43 | 168–173 |

*"sh" signifies "shoulder"

The organic base materials to which the invention of this application applies include all dyes which belong to categories derived from their dyeing properties, including water-soluble dyes such as basic dyes, acidic dyes, direct dyes, soluble vat dyes, mordant dyes, etc., and insoluble dyes such as sulfide dyes, vat dyes, oil-soluble dyes, disperse dyes, azoic dyes, oxidation dyes, etc., or reactive dyes, etc. These organic base materials include not only dyes which exhibit a coloration when illuminated with sunlight but also colorless or light yellow colored fluorescent whitener type dyes.

Of the above-mentioned dyes, those which are preferred in the invention of this application include dyes which belong to various chemical structural categories such as the quinoneimine dyes (azine dyes, oxazine dyes, thiazine dyes, etc.), the methine and polymethine dyes (cyanine dyes, azomethine dyes, etc.), the azo dyes, the anthraquinone dyes, the indoamine dyes and indophenol dyes, the indicoid dyes, the carbonium dyes, the formazan dyes, and the pyrazoloazole dyes, etc.

The organic base materials in the invention of this application include all polymeric compounds such as polyolefins, polyamides, polydienes, poly(vinyl chloride), poly(acrylic acid), polystyrene, poly(vinyl alcohol), polyesters, polyethers, polyurethanes, polyacetals, polycarbonates, polyphenyleneoxides, etc. Of these polymeric compounds, the invention of this application is preferably applied to polyolefins, polydienes, polystyrenes, etc.

The organic base materials in the invention of this application include all the methine based dyes such as the cyanine dyes, the naphthoquinone dyes, the indoaniline dyes and the azulene based dyes, etc., of the type which are used for high density optical recording, for example, as recording media for optical discs.

Examples of dyes which can be used as the base materials in the execution of the invention are indicated below. However, the invention is not limited to only these examples.

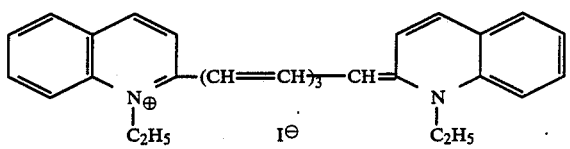

1.

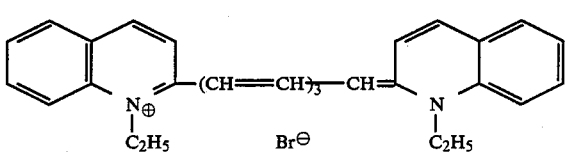

2.

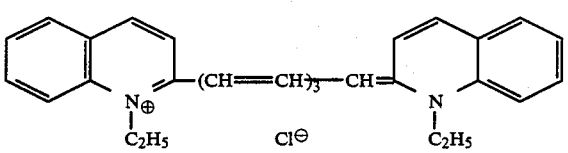

3.

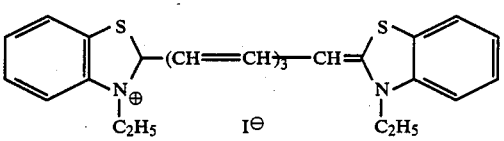

4.

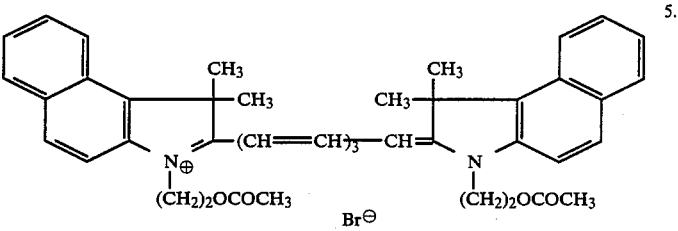

5.

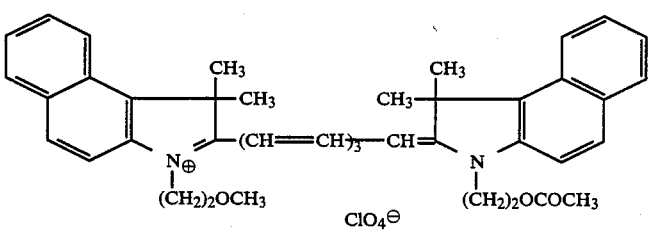

6.

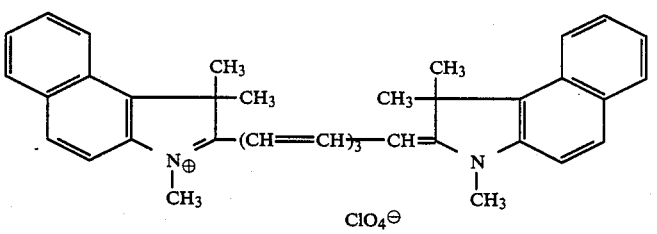

7.

8.

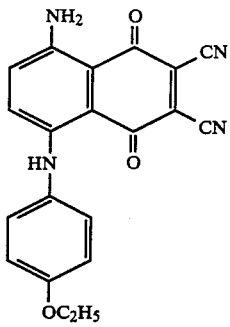

9.

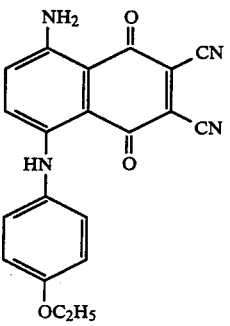

10.

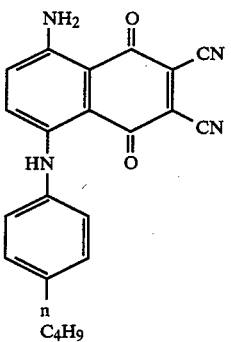

11.

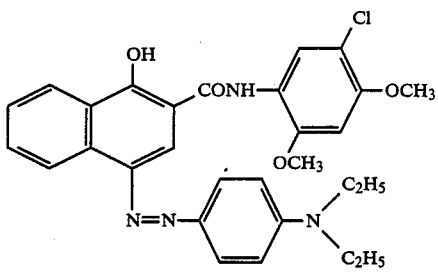

As has been described above, the metal complexes of this invention are used to stabilize organic base materials. This stabilizing effect is realized when the metal complex and the organic base material are uniformly dispersed in a suitable medium or binding agent. Polymeric materials such as plastics can be cited as examples of such media and binding agents.

Actual examples of suitable medium or binding agents include polyesters as typified by poly(ethylene terephthalate), cellulose esters such as cellulose diacetate, cellulose triacetate, cellulose acetate, cellulose acetate butyrate, etc., polyolefins such as polyethylene, polypropylene, etc., polyvinyl compounds such as poly(vinyl chloride), poly(vinylidene chloride), vinyl chloride-vinyl acetate copolymers, polystyrene, etc., acrylic addition polymers such as poly(methyl methacrylate), etc., polycarbonates consisting of poly(carbonic acid esters), phenolic resins, urethane based resins and hydrophilic binders such as gelatin.

The preferred media are as follows:

(i) Polyolefins

Representative examples include polyethylene, polypropylene, poly(4-methylpentene-1), etc.

(ii) Polyolefin Copolymers

For example, ethylene-vinyl acetate copolymers, ethylene-acrylate copolymers, ethylene-acrylic acid copolymers, ethylene-propylene copolymers, ethylene-butene-1 copolymers, ethylene-maleic anhydride copolymers, ethylene-propylene terpolymers (EPT), etc.

In this case, comonomers of any polymerization ratio can be used.

(iii) Vinyl Chloride Copolymers

For example, vinyl acetate-vinyl chloride copolymers, vinyl chloride-vinylidene chloride copolymers, vinyl chloride-maleic anhydride copolymers, copolymers of vinyl chloride with acrylic acid esters or methacrylic acid esters, acrylonitrile-vinyl chloride copolymers, vinyl ether chloride copolymers, ethylene or propylene-vinyl chloride copolymers, graft polymers in which vinyl chloride is grafted onto an ethylene-vinyl acetate copolymer, etc. In this case, copolymers of any polymerization ratio can be used.

(iv) Vinylidene Chloride Copolymers

Representative examples include vinylidene chloride-vinyl chloride copolymers, vinylidene chloride-vinyl chloride-acrylonitrile copolymers, vinylidene chloride-butadiene-vinyl halide copolymers, etc. In this case copolymers of any polymerization ratio can be used.

(v) Polystyrene (vi) Styrene Copolymers

For example, styrene-acrylonitrile copolymers (AS resins), styrene-acrylonitrile-butadiene copolymers (ABS resins), styrene-maleic anhydride copolymers (SMA resins), styrene-acrylate-acrylonitrile copolymers, styrene-butadiene copolymers (SBR), styrene-vinylidene chloride copolymers, styrene-methyl methacrylate copolymers, etc. In this case, copolymers of any polymerization ratio can be used.

(vii) Styrene Type Polymers

For example, polymers of α-methylstyrene, p-methylstyrene, 2,5-dichlorostyrene, α,β-vinylnaphthalene, α-vinylpyridine, acenaphthene, vinylanthracene, etc., and copolymers of these compounds, such as α-methylstyrene-methacrylate copolymers.

(viii) Coumarone-Indene Resins

Representative examples include coumarone-indene-styrene copolymers.

(ix) Terpene Resins or Picolites

For example, terpene resins which are polymers of limonene obtained from α-pinene and picolites obtained from β-pinene.

(x) Acrylic Resins

Those acrylic resins which contain the atomic grouping indicated by the formula below are especially desirable:

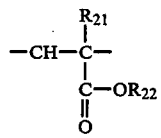

wherein $R_{21}$ represents a hydrogen atom or an alkyl group and $R_{22}$ represents a substituted or unsubstituted alkyl group. In this case, $R_{21}$ is preferably a hydrogen atom or a lower alkyl group which has 1 to 4 carbon atoms. A hydrogen atom or a methyl group is especially desirable as $R_{21}$.

Furthermore, $R_{22}$ may be either a substituted or an unsubstituted alkyl group. However, $R_{22}$ is preferably an alkyl group which has 1 to 8 carbon atoms. When $R_{22}$ takes the form of a substituted alkyl group the preferred substituents are hydroxyl groups, halogen atoms or amino groups (especially dialkylamino groups).

The atomic groupings of the type shown by the above mentioned formula may be formed into various acrylic resins by forming copolymers with other repeating atomic groupings. Normally, however, they are formed into acrylic resins consisting of homopolymers or copolymers in which the repeating unit is formed by one, two or more atomic groupings as indicated by the above mentioned formula.

(xi) Polyacrylonitrile (xii) Acrylonitrile Copolymers

For example, acrylonitrile-vinyl acetate copolymers, acrylonitrile-vinyl chloride copolymers, acrylonitrile-styrene copolymers, acrylonitrile-vinylidene chloride copolymes, acrylonitrile-methyl methacrylate copolymers, acrylonitrile-butadiene copolymers, acrylonitrile-butyl acrylate copolymers, etc. In this case copolymers of any polymerization ratio can be used.

(xiii) Diacetoneacrylamide Polymers

Representative examples include diacetone-acrylamide polymers in which acetone has been made to act upon acrylonitrile.

(xiv) Poly(Vinyl Acetate)

(xv) Vinyl Acetate Copolymers

For example, copolymers with acrylic acid esters, vinyl ethers, ethylene, vinyl chloride, etc. These may have any copolymer ratio.

(xvi) Poly(Vinyl Ethers)

For example, poly(vinyl methyl ether), poly(vinyl ethyl ether), poly(vinyl butyl ether), etc.

(xvii) Polyamides

The polyamides may be the usual homo-nylons such as nylon 6, nylon 6-6, nylon 6-10, nylon 6-12, nylon 9, nylon 11, nylon 12, nylon 13, etc., or polymers such as nylon 6/6-6/6-10, nylon 6/6-6/12, nylon 6/6-6/11, etc., or, depending on the case, modified nylons.

(xviii) Polyesters

For example, the condensates or cocondensates of various dibasic acids, namely aliphatic dibasic acids such as oxalic acid, succinic acid, maleic acid, adipic acid, sebacic acid, etc., and aromatic dibasic acids such as isophthalic acid, terephthalic acid, etc., with glycols such as ethylene glycol, tetramethylene glycol, hexamethylene glycol, etc., are ideal. Of these polymers, the condensates of aliphatic dibasic acids and glycols and the cocondensates of glycols and aliphatic dibasic acids are especially preferred.

Moreover, the use of modified glyptal resins in which a glyptal resin, condensate of phthalic anhydride and glycerine, has been modified by esterification with an aliphatic acid or a natural resin etc., is ideal.

(xix) Poly(Vinyl Acetal) Based Resins

The use of any poly(vinyl formal), poly(vinyl acetal) based resin obtained by the acetalization of poly(vinyl alcohol) is ideal.

In this case, poly(vinyl acetal) based resins of any degree of acetalization can be used.

(xx) Polyurethane Resins

Thermoplastic polyurethane resins which have urethane bonds may be used. Furthermore, polyurethane resins obtained by condensing glycols with diisocyanates and especially those obtained by condensing alkylene glycols with alkylene diisocyanates are ideal.

(xxi) Polyethers

Representative examples include styreneformalin resin, ring opening polymers of cyclic acetals, copolymers of polyethyleneoxide and glycol, polypropyleneoxide and glycol, propyleneoxideethyleneoxide copolymers, polyphenyleneoxide, etc.

(xxii) Cellulose Derivatives

For example, various esters and ethers of cellulose, such as nitrocellulose, acetylcellulose, ethyl cellulose, acetyl butyl cellulose, hydroxyethyl cellulose, hydroxypropyl cellulose, methyl cellulose, ethyl hydroxyethyl cellulose, etc., and mixtures thereof.

(xxiii) Polycarbonates

For example, various polycarbonates such as poly(dioxydiphenylmethane carbonate), (dioxydiphenylpropane carbonate), etc.

(xxiv) Ionomers

Representative examples include sodium, lithium, zinc and magnesium, etc., salts of methacrylic acid, acrylic acid, etc.

(xxv) Ketone Resins

For example, condensates of cyclic ketones such as cyclohexanone and acetophenone, etc., with formaldehyde.

(xxvi) Xylene Resins

For example, condensates of m-xylene or mesitylene with formalin or modifications thereof.

(xxvii) Petroleum Resins

Representative examples include $C_5$ based resins, $C_9$ based resins, $C_5$–$C_9$ copolymer based resins, dicyclopentadiene based resins or copolymers or modifications thereof, etc.

(xxviii) Blends of two or more of the polymers described in (i) to (xxvii) above or blends with other thermoplastic resins.

The organic base materials in the invention of this application include all the image forming dyes which are used in the field of photography, for example, the dyes which are formed from color couplers, DRR compounds, DRR couplers, amidolazone compounds, dye developing agents, etc., and the dyes which are used in silver dye bleaching processes.

The compounds disclosed on pages 15 to 25 of the specification of Japanese Patent Application (OPI) No. 12129/80 (the term "OPI" as used herein refers to a "published unexamined Japanese Patent Application"), the compounds corresponding to the literature cited therein and in U.S. Pat. Nos. 3,725,067 and 4,540,654 and Japanese Patent Application (OPI) No. 171956/84 can be used effectively as the organic base materials.

The metal complexes of this invention will stabilize base materials as described above. When these compounds are used in the field of photography they may be present in any or all of the emulsion layers. These compounds may also be present in any of the layers, including the non-light-sensitive parts, of color transfer materials.

When used in the field of photography these complexes can be dissolved in a low boiling point organic solvent or an organic solvent which is miscible with water. Examples of apropriate organic solvents include alcohols (methanol, ethanol, isopropanol, butanol, etc.), ethers (dimethyl ether, ethyl methyl ether, diethyl ether, 1-ethoxypropane, etc.), glycols (1,2-ethanediol, 1,2-propanediol, 1,3-propanediol, etc.), ketones (acetone, ethyl methyl ketone, 3-pentanone, etc.), esters (ethyl formate, methyl acetate, ethyl acetate, etc.) and amides (formamide, acetamide, succinamide, etc.), which do not have an adverse effect on the photographic properties. The solution of the instant complex and organic solvent can then be added to the hydrophilic colloid from which the photographic layers are constructed to provide stabilization of the base materials. This process is preferably carried out in a precoating process, for example, in the process in which the silver halide photographic emulsion is being prepared, in the process in which the coupler is being emulsified and dispersed, or in the process in which the photographic coating liquid is being prepared, etc.

Furthermore, the same methods as those disclosed for the dispersion of couplers can be employed to introduce the complexes into the hydrophilic colloids from which the photographic layers are constructed. Thus, the high boiling point organic solvents indicated for the dissolution of materials in U.S. Pat. Nos. 2,304,939 and 2,322,027 may be used. Other useful methods are disclosed in U.S. Pat. Nos. 2,801,170, 2,801,171 and 2,949,360, where a low boiling point or water-miscible organic solvent is used conjointly with a high boiling point solvent.

Effective high boiling point solvents for dispersing the base materials and metal complexes of this invention include di-n-butyl phthalate, benzyl phthalate, triphenyl phosphate, tri-o-cresyl phosphate, diphenyl mono-p-tert-butylphenyl phosphate, monophenyl di-p-tert-butylphenyl phosphate, diphenyl mono-o-chlorophenyl phosphate, monophenyl di-o-chlorophenyl phosphate, 2,4-di-n-amylphenol, 2,4-di-tert-amylphenol, N,N-diethyllauramide and the trioctyl phosphate and trihexyl phosphate, etc., disclosed in U.S. Pat. No. 3,676,137.

Low boiling point and water-miscible organic solvents which can be used advantageously in conjunction with these high boiling point solvents are indicated, for example, in U.S. Pat. Nos. 2,801,171, 2,801,170 and 2,949,360. These organic solvents include:

(1) low boiling point organic solvents which are substantially insoluble in water, for example, methyl, ethyl, propyl and butyl acetates, isopropyl acetate, ethyl propionate, sec-butyl alcohol, ethyl formate, butyl formate, nitromethane, nitroethane, carbon tetrachloride, chloroform, etc., and (2) water-soluble organic solvents, for example, methyl isobutyl ketone, $\beta$-hydroxyethyl acetate, $\beta$-butoxytetrahydrofurfuryl adipate, diethylene glycol monoacetate, methoxytriglycol acetate, acetonyl acetone, diacetone alcohol, ethylene glycol, diethylene glycol, dipropylene glycol, acetone, methanol, ethanol, acetonitrile, dimethylformamide, dioxane, etc.

Both the base material and the instant complex may be present in any or all of the hydrophilic colloid layers of a photographic element. The base material and the instant complex may also be present in the light-sensitive elements and in the non-light-sensitive elements, such as the dye image receptor and in the photographic diffusion transfer film units. In the case where the base material and the instant complex are included in a non-light-sensitive image recording element of this type, it is desirable that the base material should be mordanted. Hence, when used in this way, the complex preferably has a molecular form such that it can be retained in the mordant layer of the image receptor so that it is not separated by diffusion from the dye which is to be stabilized.

When the method of this invention is used to improve the light resistance of photographic elements such as image transfer film units there are several applications in which they can be considered to be effective. One application is in imbibition transfer film units such as those disclosed in U.S. Pat. No. 2,882,156. Another application is in color image transfer film units of the types disclosed in U.S. Pat. Nos. 2,087,817, 3,185,567, 2,983,606, 3,253,915, 3,227,550, 3,227,551, 3,227,552, 3,415,644, 3,415,645, 3,415,646, 3,594,164 and 3,594,165 and Belgian Patents 757,959 and 757,960.

The complexes and the base materials used in the execution of the invention can be used in accordance with the method and along with the materials disclosed on pages 107 to 110 of the *Product Licensing Index*, Vol. 92 (December, 1971), No. 9232.

Any quantity of the instant complex will bring about the improvement of this invention and in theory no upper limitation is imposed on the quantity which can be used. The inclusion of at least 1 micromol of complex per square meter of light-sensitive material is preferred. The inclusion of about 10 to $1 \times 10^4$ micromol of complex per square meter of light-sensitive material is most desirable.

Furthermore, these metal complexes may also be used conjointly with ultraviolet absorbers such as the tinuvin and hydroquinone based systems.

In general, the base material concentration should be equal to the concentration normally used for color photography. These concentrations are well known to those who are familiar with color photography. The presence of base materials in amounts within the range of about 10 to $10^4$ micromol per square meter of light-sensitive material is prefered, and most desirably the base material is present in an amount within the range of about 100 to $3 \times 10^3$ micromol per square meter of light-sensitive material.

All the materials normally used as support for photographic photosensitive materials can be employed for the photographic photosensitive materials to which the method of this invention is applied. Examples of such supports include cellulose nitrate films, cellulose acetate films, cellulose acetate butyrate films, cellulose acetate propionate films, polystyrene films, poly(ethylene terephthalate) films, polycarbonate films and laminates of these materials, paper, etc. Supports such as paper which has been coated or laminated with baryta or an α-olefin polymer, especially an α-olefin polymer which has 2 to 10 carbon atoms, such as polyethylene, polypropylene, etc., and plastic films, etc., of which the surface has been roughened to improve the adhesion of other polymeric materials as indicated in Japanese Patent Publication No. 19068/72, are ideal.

Various hydrophilic colloids can be used in the photographic materials to which the method of this invention is applied. Examples of the various hydrophilic colloids which may be used include gelatin, colloidal albumin, casein, cellulose derivatives such as carboxymethyl cellulose, hydroxyethyl cellulose, etc., sugar derivatives such as agar, sodium alginate and starch derivatives, etc., and synthetic hydrophilic colloids. Additional examples include poly(vinyl alcohol), poly(N-vinylpyrrolidone), poly(acrylic acid) copolymers, maleic anhydride copolymers, and polyacrylamide or derivatives or partial hydrolyzates thereof. As described above, these materials can be used as the hydrophilic colloids which function as binders for use in photographic emulsions and/or other structural photographic layers. Compatible mixtures of two or more of these colloids can be used as required.

Gelatin is the most widely used of these materials. However, materials in which part or all of the gelatin has been replaced with synthetic polymer materials, or materials in which the gelatin has been replaced with so-called gelatin derivatives may be used. For example, materials in which the amino groups, imino groups, hydroxyl groups, or carboxyl groups which are the functional groups which are included in the molecules, and have been treated or modified with reagents which have a group which is able to react with these groups, or graft polymers in which the material has been bonded to the molecular chains of other macromolecular materials can also be used.

The photographic emulsion layers and other layers to which the invention is applied may contain synthetic polymeric compounds. Examples of synthetic polymeric compounds include latex-like aqueous dispersions of vinyl compound polymers, especially compounds which increase the dimensional stability of the photographic materials. The synthetic polymeric compounds may be used either singly or as mixtures (of different types of polymer), or they may contain combinations of these materials with hydrophilic water-permeable colloids.

The silver halide photographic emulsions which are used in the method of this invention are normally prepared by mixing a solution of a water-soluble silver salt (for example, silver nitrate) with a solution of a water-soluble halide (for example, potassium bromide) in the presence of a water-soluble polymer solution such as gelatin. Examples of appropriate silver halide grains which may be used include silver chloride and silver bromide, as well as the mixed silver halides such as silver chlorobromide, silver iodobromide, silver chloroiodobromide, etc. The silver halide grains may be prepared in accordance with the well known and conventional methods. Of course, the silver halide grains can also be prepared using the single or double jet methods and the controlled double jet methods, etc. Furthermore, two or more types of silver halide photographic emulsions which have been formed separately may be used together in the form of a mixture.

Various compounds can be added to the above-mentioned photographic emulsions in order to prevent the lowering of sensitivity or fogging during the manufacture, storage or processing of the photosensitive material. Many suitable compounds have long been known, for example, a number of heterocyclic compounds such as 4-hydroxy-6-methyl-1,3,3a,7-tetraazaindene, 3-methylbenzothiazole and 1-phenyl-5-mercaptotetrazole, mercury containing compounds, mercapto compounds, metal salts, etc.

The silver halide emulsions which are used in the invention can be chemically sensitized in the usual way. Chemical sensitizers include gold compounds such as chloroaurates, and gold trichloride, etc., the salts of noble metals such as platinum, palladium, iridium or rhodium, sulfur compounds such as sodium thiosulfate which react with silver salts and form silver sulfide, stannous salts, amines and other reducing substances.

Spectral sensitization and supersensitization can be achieved as desired in the photographic emulsions which are used in the method of this invention by using cyanine dyes such as cyanine dyes, merocyanine dyes, carbocyanine dyes, etc., independently or in combination, or alternatively in combination with styryl dyes. The choice can be determined arbitrarily according to the wavelength region which is to be sensitized, the sensitivity, and according to the intended purpose and application of the photosensitive material.

The hydrophilic colloid layers of the photosensitive materials used in the method of this invention can be hardened with various crosslinking agents as required. For example, representative crosslinking compounds include aldehyde based compounds, active halogen compounds, vinylsulfone compounds, carbodiimide compounds, n-methylol compounds and epoxy compounds.

In one embodiment of this invention, the color photographic photosensitive material is processed in the conventional way after imagewise exposure to form a colored image. The principal processes in this case are color development, bleaching and fixing processes and, as required, washing and stabilizing processes. It is possible to carry out two or more of these processes, for example, bleaching and fixing, in a single bath. The color development is normally carried out in an alkaline solution which contains an aromatic primary amine developing agent.

In another embodiment of this invention where the color photographic photosensitive material takes the form of a color diffusion transfer film unit, the processing of the photosensitive material is carried out automatically within the photosensitive material. In this case the developing agent is contained in a breakable container. N-methylaminophenol, 1-phenyl-3-pyrazolidone, 1-phenyl-4,4-dimethyl-3-pyrazolidone, 1-phenyl-4-methylhydroxymethyl-3-pyrazolidone, 3-methoxy-N,N-diethyl-p-phenylenediamine, etc., can be used as the developing agent as well as the aforementioned primary aromatic amine developing agents.

The method of this invention may be applied to well known methods to form color images in photographic photosensitive materials. These well known methods include those in which a coupling reaction between the dye forming color couplers mentioned earlier and the oxidation product of p-phenylenediamine based color developing agents occurs, those in which dye developing agents are used, those in which the oxidative destructive reactions of DRR compounds are used, those in which dye releasing reactions due to the coupling reactions of DRR couplers are used, those in which dye forming reactions due to coupling reactions with DDR couplers are used, and those in which the silver dye bleaching method is used.

Hence, when the method of this invention is applied to photographic photosensitive materials it can be applied to a variety of such materials including color positive films, color papers, color negative films, color reversal films, color diffusion transfer film units, and silver dye bleach photosensitive materials, etc.

The use of any amount of each metal complex should bring about the improvement of the invention and even if it is used excessively it will not affect the product other than to impart an undesirable coloration.

Accordingly, there is theoretically no upper limit to the amount of the metal complex which may be used.

The presence of at least 0.01 mol% of the metal complex with respect to all of the organic base material is preferred and the presence of at least 0.1 mol% of the metal complex is most desirable. The effect achieved corresponds to the amount of metal complex added so there is no upper limit. However, in practice an amount of not more than 100,000 mol% is used.

Furthermore, the metal complexes of the invention may be used in combination with ultraviolet absorbers such as, for example, the tinuvin systems and hydroquinone systems, etc.

The invention will be described in more detail below by means of examples.

EXAMPLE 1

Compound (2) (0.2%, by weight) was added to polypropylene powder and pressed for 1 minute at 190° C. to form a film (200 μm). This film was then exposed to light at a panel temperature of 60° C. under conditions of 50% relative humidity in a xenon weathermeter (Atlas Weather-O-meter (6.5 kw xenon lamps, illuminance 100,000 lux)) and the degradation of the polypropylene was investigated by measuring the carbonyl index in connection with the exposure time. Polypropylene to which no addition had been made was used as a control. The results obtained are shown in FIG. 1.

In FIG. 1 the solid line relates to the case of polypropylene to which no compound of this invention had been added and the broken line relates to the case of polypropylene to which Compound (2) of this invention had been added.

In FIG. 1, the carbonyl index was obtained utilizing the infrared spectrum by tracing the extent of carbonyl group formation which accompanied the photodegradation of the polypropylene, and dividing the absorbance of the sample at 1,700 cm$^{-1}$ by the sample thickness (microns).

It is clear from FIG. 1 that Compound (2) had the effect of suppressing the photodegradation of polypropylene.

EXAMPLE 2

Fading tests were carried out with various base dyes in dimethylformamide solution (20 ml) in the presence of metal complexes. Prior to irradiation with light, $2 \times 10^{-4}$ mol of the base dye and $6 \times 10^{-4}$ mol of the metal complex were dissolved in these solutions.

The exposure was carried out using a xenon lamp (200,000 lux) fitted with a UV cut-off filter. The exposure time was 200 hours.

The results obtained are shown in Table 2.

TABLE 2

| Sample No. | Base Dye | Metal Complex | Residual Dye (%) | Blank* (%) |
|---|---|---|---|---|
| 1 | 1 | (2) | 78 | 0 |
| 2 | 2 | (2) | 85 | 0 |
| 3 | 3 | (42) | 62 | 0 |
| 4 | 4 | (42) | 76 | 0 |
| 5 | 7 | (42) | 81 | 0 |
| 6 | 8 | (42) | 93 | 70 |

*Residual dye on exposure without the addition of a metal complex.

EXAMPLE 3

The components indicated below were mixed together in the proportions shown as parts by weight using Metal Complexes (79) and (82). After stirring thoroughly and filtering, the solutions were coated using the flow spreading method onto a metal support to form a film. The films so obtained were then separated from the support (thickness: 25 microns).

These films were exposed to the light from a xenon lamp (200,000 lux) for 5 hours and the residual dye levels were investigated.

The results obtained are shown in Table 3.

| Composition | |
|---|---|
| TAC (cellulose triacetate) | 170 parts |
| TPP (triphenyl phosphate) | 10 parts |
| Methylene Chloride | 800 parts |

-continued

| Composition | |
|---|---|
| Methanol | 160 parts |
| Metal Complex (79) or (82) | 2 parts |
| Base Compound | 1 part |

TABLE 3

| Sample No. | Base Dye | Metal Complex | Residual Dye (%) | Blank* (%) |
|---|---|---|---|---|
| 7 | 1 | (79) | 88 | 36 |
| 8 | 2 | (79) | 92 | 38 |
| 9 | 3 | (82) | 90 | 41 |
| 10 | 4 | (82) | 85 | 40 |
| 11 | 7 | (82) | 81 | 35 |
| 12 | 8 | (82) | 98 | 72 |

*Residual dye on exposure without the addition of a metal complex.

EXAMPLE 4

1-(2,4,6-Trichlorophenyl)-3-(2-chloro-5-tetradecanamido)anilino-4-[4-(N-ethyl-N-$\beta$-methanesulfonamidoethyl)aminophenylimino]-5-oxo-2-pyrazoline (0.1 g) was dissolved in 3 ml of tricresyl phosphate and 5 ml of ethyl acetate and the resulting solution was emulsified and dispersed in 10 g of 10% gelatin which contained 1 ml of 1% aqueous sodium dodecylbenzenesulfonate solution. The emulsified dispersion was then mixed with 10 g of 10% gelatin and coated onto a paper support of which both sides had been laminated with polyethylene, and dried (Sample A).

Sample B was prepared by adding 30 mg of Compound (82) of this invention when preparing an emulsified dispersion in the same way as described above, and coating this emulsified dispersion in the same way as for sample A. Samples C and D were prepared by adding 15 mg and 150 mg, respectively of 2,5-di-tert-octylhydroquinone, a known agent for preventing the light-fading of dyes, and coating the emulsified dispersion in the same way as for Sample A. The coating was carried out in such a way as to provide a dye coating of 60 mg/m$^2$ in each case. Samples A to D were then subjected to 48 hour fading tests in a xenon tester (illuminance 200,000 lux) to which a C-40 ultraviolet cut-off filter made by the Fuji Photo Film Co. had been fitted. The results obtained are shown in Table 4.

TABLE 4

| | Initial Density | Density after Test |
|---|---|---|
| Sample A | 0.83 | 0.10 |
| Sample B | 0.80 | 0.72 |
| Sample C | 0.81 | 0.24 |
| Sample D | 0.77 | 0.43 |

The measurements were made with a Macbeth densitometer model RD514 with a status AA green filter. Sample B, which contained Compound (82) of this invention, faded to a much smaller extent than Samples A, C and D and it has been confirmed that even when di-tert-octylhydroquinone is added in an equimolar amount or in an amount 10 times greater than an equimolar amount with respect to Compound (82) of this invention, it has very little suppressing effect on the fading. This shows that Compound (82) of this invention has a surprisingly large suppressing effect on the light fading of dyes.

EXAMPLE 5

Compound (82) (0.1 g) was dissolved in 0.2 cc of 1N NaOH and 2 cc of methanol and the resulting solution was added to 10 g of 10% gelatin. This solution was then coated in such a way that the Compound (82) was coated at the rate of 80 mg/m$^2$ onto a paper support which had been laminated on both sides with polyethylene (Sample E).

Sample F was prepared in the same way with the addition of a solution obtained by dissolving 40 mg of Compound (17) of this invention in 2 cc of methanol immediately before coating, the coating being carried out in the same way as for Sample E. Sample G was prepared as a comparative sample using the same coating method as before but with the addition of 20 mg of 2,5-di-tert-octylhydroquinone, a known agent for suppressing the light fading of dyes. These samples were subjected to 12 hour fading tests using a UV cut-off filter in the same way as in Example 2. The results obtained are shown in Table 5.

TABLE 5

| | Initial Density | Density after Test |
|---|---|---|
| Sample E | 0.90 | 0.11 |
| Sample F | 0.90 | 0.64 |
| Sample G | 0.91 | 0.29 |

The measurements were made with a Macbeth densitometer in the same way as in Example 2. It is clear from these results that the suppressing effect on light fading of Compound (17) of this invention was very large.

EXAMPLE 6

10 g of magenta coupler, 1-(2,4,6-trichlorophenyl)-3-[(2-chloro-5-tetradecanamido)anilino]-2-pyrazoline-5-one, was dissolved in a mixture of 30 ml tricresyl phosphate, 5 ml of dimethylformamide and 15 ml of ethylacetate and the solution so obtained was emulsified and dispersed in 80 g of a 10% aqueous gelatin solution which contained 8 ml of 1% aqueous sodium dodecylbenzenesulfonate solution.

This emulsified dispersion was then mixed with 145 g of a green-sensitive silver chlorobromide emulsion (50 mol% Br; silver content 7 g), sodium dodecylbenzenesulfonate was added as a coating assistant and the mixture was coated onto a paper support of which both sides had been laminated with polyethylene (Samle H). The coupler coating rate was 400 mg/m$^2$.

Sample I was prepared in the same way by adding 2.5 g of Compound (82) of this invention during the preparation of the above-mentioned emulsified dispersion and coating the mixture in the same way as for Sample H. Sample J was prepared similarly by adding 1.0 g of 2,5-di-tert-octylhydroquinone, a known agent for suppressing the light fading of dyes, and coating the mixture in the same way as for Sample H. These samples were exposed for 1 second at 1,000 lux and then processed in the following processing baths.

| Developing Bath | |
|---|---|
| Benzyl Alcohol | 15 ml |
| Diethylenetriaminepentaacetic Acid | 5 g |
| KBr | 0.4 g |
| Na$_2$SO$_3$ | 5 g |
| Na$_2$CO$_3$ | 30 g |
| Hydroxylamine Sulfate | 2 g |

| | | |
|---|---|---|
| 4-Amino-3-methyl-N—β-(methane-sulfonamido)ethylaniline·3/2H$_2$SO$_4$·H$_2$O | 4.5 g | |
| Water to make | 1,000 ml | |
| | pH 10.1 | |
| Bleach-Fix Bath | | |
| Ammonium Thiosulfate (70 wt %) | 150 ml | |
| Na$_2$SO$_3$ | 5 g | |
| Na[Fe(EDTA)] | 40 g | |
| EDTA | 4 g | |
| Water to make | 1,000 ml | |
| | pH 6.8 | |

| Processing Procedure | Temperature (°C.) | Time |
|---|---|---|
| Developing Bath | 33 | 3 min 30 sec |
| Bleach-Fix Bath | 33 | 1 min 30 sec |
| Wash | 28–35 | 3 min |

Each of the samples on which a colored image had been formed in this way was exposed to sunlight for a period of two (2) weeks through a Fuji Photo Film ultraviolet absorbing filter (C-40) which cut-off radiation of wavelengths below 400 nm. The results obtained are shown in Table 6. The measurements were made with a Macbeth densitometer model RD-514 (status AA filters), and the change in density from an initial density of 2.0 was measured.

TABLE 6

| | Density after Testing of Component of Initial Density 2.0 | Residual Dye (%) |
|---|---|---|
| Sample H | 0.52 | 26 |
| Sample I | 1.74 | 87 |
| Sample J | 1.34 | 67 |

Residual Dye = (Density after Fading/2.0) × 100

It is clear from these results that Compound (82) of this invention is an effective anti-fading agent.

While the invention has been described in detail and with reference to specific embodiments thereof, it will be apparent to one skilled in the art that various changes and modifications can be made therein without departing from the spirit and scope thereof.

What is claimed is:

1. A method of stabilizing a dye or an image forming dye to light, which comprises allowing a dye or an image forming dye to coexist with at least one metal complex compound having the formula:

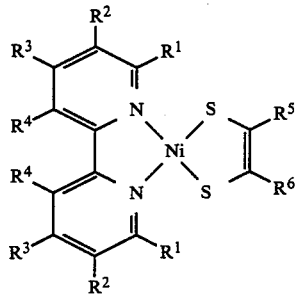

wherein the at least one metal complex compound is present in an amount of 0.01 to 100,000 mol % with respect to the dye or the image forming dye, and $R^1$ to $R^4$ are each independently hydrogen atoms, halogen atoms, cyano groups, hydroxyl groups, or alkyl groups, aryl groups, cycloalkyl groups or heterocyclic groups which are bonded directly or indirectly through a divalent linking group to a carbon atom on a benzene ring; two adjacent substituents from among $R^1$ to $R^4$ may be joined together to form a ring; the two $R^4$ substituents may also be joined together to form a ring; $R^5$ and $R^6$ are independently hydrogen atoms, alkyl groups, alkylthio groups, aryl groups, arylthio groups, heterocyclic thio groups or cyano groups; the $R^5$ and $R^6$ substituents may be joined together to form a ring, with the proviso that when $R^1$ to $R^4$ each is a hydrogen atom, $R^5$ and $R^6$ is not a phenyl group.

2. The method of claim 1, wherein the image forming dye used in the field of photography is selected from the group consisting of the dyes which are formed from color couples, DRR compounds, DRR couplers, amidolazone compounds, dye developing agents and the dyes which are used in silver dye bleaching process.

3. The method of claim 2, wherein the dye is selected from the group consisting of quinoneimine dyes, methine dyes, polymethine dyes, azo dyes, anthraquinone dyes, indoamine dyes, indophenol dyes, indicoid dyes, carbonium dyes and pyrazoloazole dyes.

4. An optical disc comprising a recording media containing a dye, wherein said dye is stabilized by the method of claim 1.

5. The method of claim 1, wherein $R^1$ to $R^6$ are each independently alkyl groups containing 1 to 20 carbon atoms or aryl groups containing 6 to 14 carbon atoms.

6. The method of claim 1, wherein $R^1$ to $R^4$ are each independently heterocyclic groups having 5- or 6-membered rings or cycloalkyl groups having 5- or 6-membered rings.

7. The method of claim 1, wherein the rings which are formed by the joining together of adjacent substituents from among $R^1$ to $R^4$ or the rings formed by the joining together of the two $R^4$ substituents are 6-membered rings.

8. The method of claim 1, wherein the divalent linking group is selected from the group consisting of an oxy group, thio group, amino group, oxycarbonyl group, carbonyl group, carbamoyl group, sulfamoyl group, carbonylamino group, sulfonyl group and carbonyloxy group.

9. The method of claim 1, wherein $R^1$ to $R^4$ are each independently an aryl group selected from the group consisting of an aryloxy group, aryloxycarbonyl group, acyl group, anilino group, acyloxy group, arylcarbamoyl group, arylsulfamoyl group, arylsulfonylamino group, arylsulfonyl group and acylamino group.

10. The method of claim 1, wherein $R^5$ to $R^6$ is each independently an alkylthio group containing 1 to 20 carbon atoms or an arylthio group containing 6 to 14 carbon atoms.

11. The method of claim 1, wherein the heterocyclic group of the heterocyclicthio group represented by $R^5$ and $R^6$ is a 5- or 6-membered heterocyclic group containing at least one nitrogen atom, oxygen atom or sulfur atom in the ring as a hetero atom.

12. The method of claim 1, wherein the $R^5$ and $R^6$ substituents are joined together to form a 5- or 6-membered ring.

13. The method of claim 1, wherein the metal complex and the organic base material are dispersed in a binding agent.

14. A photographic photosensitive material comprising a support and at least one hydrophilic colloid layer, wherein at least one hydrophilic layer contains a dye or an image forming dye and at least one metal complex compound, said photographic material being stabilized by the method of claim 1.

15. The photographic photosensitive material of claim 14, wherein said photographic photosensitive material is selected from the group consisting of color positive film, color paper, color negative film, color reversal film, color diffusion transfer film units and a silver dye bleach photosensitive material.

16. The photographic photosensitive material of claim 14, wherein the hydrophilic colloid layer is a light sensitive emulsion layer or a non-light sensitive layer.

17. The photographic photosensitive material of claim 14, which comprises at least 1 micromol of complex per square meter of said photosensitive material.

18. The photographic photosensitive material of claim 14, which comprises 10 to $10^4$ micromol of said dye or image forming dye per square meter of said photosensitive material.

19. A photographic photosensitive material which comprises a support and at least one hydrophilic colloid layer, wherein at least one hydrophilic colloid layer contains a dye or an image forming dye and at least one metal complex compound having the formula:

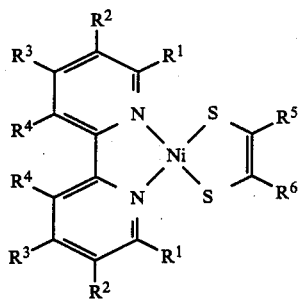

wherein $R^1$ to $R^4$ are each independently hydrogen atoms, halogen atoms, cyano groups, hydroxyl groups, or alkyl groups, aryl groups, cycloalkyl groups or heterocyclic groups which are bonded directly or indirectly through a divalent linking group to a carbon atom on a benzene ring; two adjacent substituents from among $R^1$ to $R^4$ may be joined together to form a ring; the two $R^4$ substituents may also be joined together to form a ring; $R^5$ and $R^6$ are independently hydrogen atoms, alkyl groups, alkylthio groups, aryl groups, arylthio groups, heterocyclic thio groups or cyano groups; the $R^5$ and $R^6$ substituents may be joined together to form a ring, with the proviso that when $R^1$ to $R^4$ each is a hydrogen atom, $R^5$ and $R^6$ is not a phenyl group.

20. An element comprising the combination of a dye or an image forming dye and at least one metal complex compound having the formula:

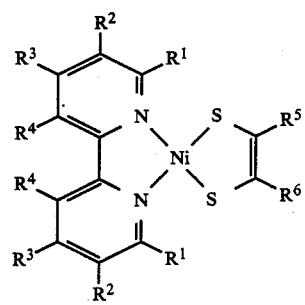

wherein $R^1$ to $R^4$ are each independently hydrogen atoms, halogen atoms, cyano groups, hydroxyl groups, or alkyl groups, aryl groups, cycloalkyl groups or heterocyclic groups which are bonded directly or indirectly through a divalent linking group to a carbon atom on a benzene ring; two adjacent substituents from among $R^1$ to $R^4$ may be joined together to form a ring; the two $R^4$ substituents may also be joined together to form a ring; $R^5$ and $R^6$ are independently hydrogen atoms, alkyl groups, alkylthio groups, aryl groups, arylthio groups, heterocyclic thio groups or cyano groups; the $R^5$ and $R^6$ substituents may be joined together to form a ring, with the proviso that when $R^1$ to $R^4$ each is a hydrogen atoms, $R^5$ and $R^6$ is not a phenyl group.

* * * * *